United States Patent [19]

Ohmae et al.

[11] Patent Number: 5,617,226

[45] Date of Patent: Apr. 1, 1997

[54] POLYMER DISPERSED LIQUID CRYSTAL PROJECTION DISPLAY HAVING POLARIZING MEANS

[75] Inventors: Hideki Ohmae, Suita; Hiroshi Takahara, Neyagawa, both of Japan

[73] Assignee: Matsushita Electric Industrial Co., Ltd., Osaka-Fu, Japan

[21] Appl. No.: 357,936

[22] Filed: Dec. 16, 1994

[30] Foreign Application Priority Data

Dec. 17, 1993 [JP] Japan .................................. 5-318033

[51] Int. Cl.$^6$ .......................... G02F 1/1335; G02F 1/1333
[52] U.S. Cl. ................................................ 349/10; 349/86
[58] Field of Search ................... 359/51, 52, 63, 359/40, 41; 353/122, 121

[56] References Cited

U.S. PATENT DOCUMENTS

| 3,891,560 | 6/1975 | Chester | 250/461 |
|---|---|---|---|
| 4,688,900 | 8/1987 | Doane et al. | 359/52 |
| 4,928,123 | 5/1990 | Takafuji | 353/122 |
| 5,113,270 | 5/1992 | Fergason | 359/51 |
| 5,150,232 | 9/1992 | Gunkima et al. | 359/51 |
| 5,172,254 | 12/1992 | Atarashi et al. | 359/40 |
| 5,239,322 | 8/1993 | Takanashi et al. | 359/40 |
| 5,245,449 | 9/1993 | Ooi et al. | 359/51 |
| 5,251,065 | 10/1993 | Uetsuki | 359/454 |
| 5,260,815 | 11/1993 | Takizawa | 359/51 |
| 5,264,950 | 11/1993 | West et al. | 359/51 |
| 5,299,036 | 3/1994 | Nicolas et al. | 359/40 |
| 5,303,073 | 4/1994 | Shirota et al. | 359/51 |
| 5,379,137 | 1/1995 | Hirai et al. | 359/51 |

FOREIGN PATENT DOCUMENTS

| 295913 | 6/1987 | European Pat. Off. . |
|---|---|---|
| 362776 | 4/1990 | European Pat. Off. . |
| 63-216026 | 9/1988 | Japan . |
| 1-183037 | 7/1989 | Japan . |
| 2-210488 | 8/1990 | Japan . |
| 4-19627 | 1/1992 | Japan . |
| 4119323 | 4/1992 | Japan . |
| 4-119323 | 4/1992 | Japan . |
| 4151193 | 5/1992 | Japan . |
| 6-18989 | 1/1994 | Japan . |

OTHER PUBLICATIONS

*A Full–Color TFT–LCD With A Polymer–Dispersed Structure* by Hidefume Yoshida et al., "Journal of the Society for Information Display", No. 4, Dec. 1993.

Primary Examiner—Anita Pellman Gross
Assistant Examiner—Toan Ton
Attorney, Agent, or Firm—Wenderoth, Lind & Ponack

[57] ABSTRACT

A liquid crystal projection device includes a light source, a polymer dispersed liquid crystal panel for forming an optical image as a function of changes in the light scattering condition, a polarizing plate disposed on at lest one of the incident and exit sides of the liquid crystal panel with respect to the direction of travel of the light, and a projection lens for projecting the optical image onto a polarizing screen. The polarizing plate is removably and rotatably supported so that, by rotating the polarizing plate, the direction of the axis of polarization of the polarizing plate can be substantially aligned with the direction of the axis of the polarizing screen. The polarizing screen is utilized when the polarizing plate is mounted, but a non-polarizing screen may be utilized when the polarizing plate is not used, i.e., removed. Where the polarizing plates is used on both of the incident and exit sides of the panel, the direction of the axis of polarization of the polarizing plate on the incident side is to be substantially aligned with that of the polarizing plate on the exit side.

22 Claims, 10 Drawing Sheets

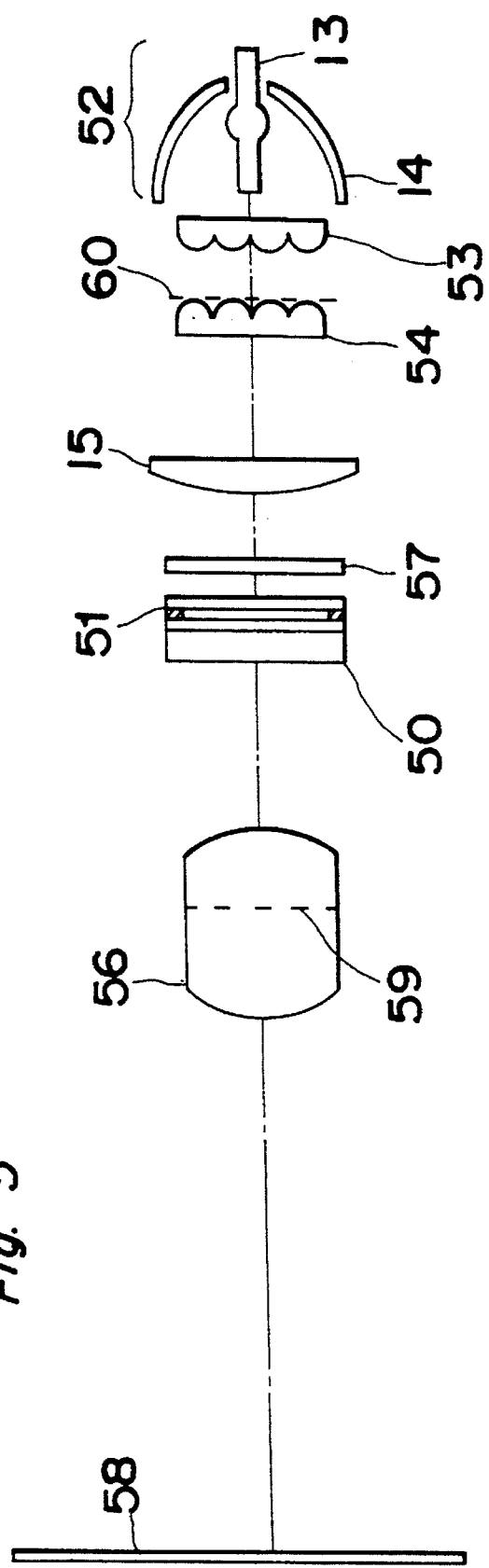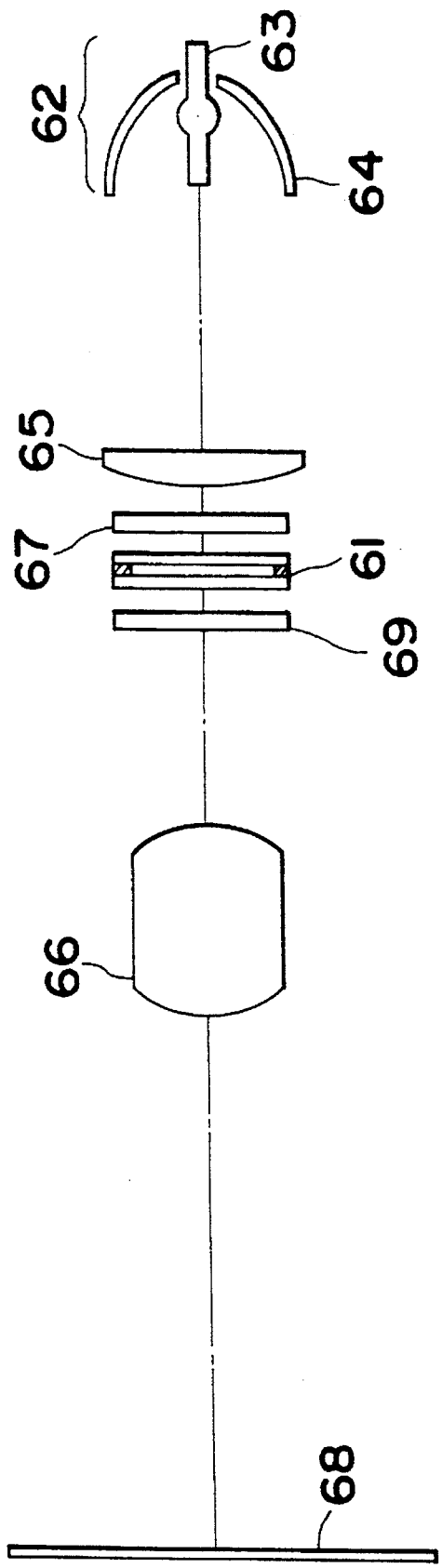

POLYMER DISPERSED LIQUID CRYSTAL PROJECTION DISPLAY HAVING POLARIZING MEANS

BACKGROUND OF THE INVENTION

1. Field of the Invention

The present invention relates to a liquid crystal display device utilizing a liquid crystal panel capable of forming an optical image as a function of change in a light scattering condition, and also to a liquid crystal projection device for projecting the optical image formed on the liquid crystal panel onto a screen to provide the image of an enlarged scale.

2. Description of the Prior Art

A large-format image presentation such as, for example, in a home theater or in a panel discussion has now come to be popular. While projection devices utilizing a light valve have been available in various types, a recent development is a liquid crystal projection device operable to project an image, formed on a compact liquid crystal panel, onto a screen to thereby provide a large-format image.

The liquid crystal panel provides an image display by essentially electrically varying an optical characteristic of the liquid crystal panel and operates on a number of principles. The twisted nematic (TN) liquid crystal panel generally employed in the liquid crystal projection device currently available in the market makes use of a phenomenon in which the rotatory polarization of liquid crystal material varies in the present of an electric field. This TN liquid crystal panel requires the use of two polarizing plates to be disposed on or adjacent opposite surfaces, that is, light incident and exit surfaces, of the liquid crystal panel and, for this reason, the TN liquid crystal panel has a problem in that the efficiency of utilization of light is low.

On the other hand, as a method of controlling light with no polarizing plate used, a method of utilizing a scattering phenomenon is known. The liquid crystal panel capable of forming an optical image by the utilization of changes in a light scattering condition is available in three models which utilize a phase-changeable liquid crystal material, a dynamic scattering liquid crystal material and a polymer dispersed liquid crystal material, respectively. Of them, the polymer dispersed liquid crystal panel such as disclosed in the U.S. Pat. No. 4,435,047 is extensively studied because it gives rise to a bright image display.

The display panel of a type utilizing the polymer dispersed liquid crystal material neither requires the use of any polarizing plate nor any orientation treatment. In the TN liquid crystal display panel, light lost by the polarizing plates are absorbed by the polarizing plates and converted into heat which would eventually elevate the temperature of not only the polarizing plates, but also the liquid crystal panel by radiation. Accordingly, once the polarizing plates and the liquid crystal panel are so heated, they quickly deteriorate. Also, the TN liquid crystal panel requires formation of an orientation film which must subsequently be rubbed. This rubbing constitutes not only a cause of increase of the number of process steps, but also a cause of reduction in yield, because thin-film transistors are destroyed by static electricity, resulting in en increase of the manufacturing cost. Also, the liquid crystal panel currently employed in the liquid crystal projection television set employs a large number of pixels, for example, 300,000 pixels or more, and consequently, attempts have been made to reduce the size of each pixel. A reduction in the size of each pixel requires the formation of an increased number of signal lines and thin-film transistors, accompanied by the formation of an increased number of surface indentations, which in turn hampers a smooth rubbing treatment.

Hereinafter, the nature of the polymer dispersed liquid crystal material will be briefly discussed. The polymer dispersed liquid crystal material may be broadly classified in two types depending on the type of liquid crystal and the condition in which polymer molecules are dispersed. One type is that droplets of liquid crystal are dispersed in the polymer and exist in the polymer in a discontinuous fashion. This type is hereinafter referred to as PDLC (polymer dispersed liquid crystal). The other type is polluter network liquid crystal (PNLC) in which a network of polymer molecules is formed in a layer of liquid crystal material as if the liquid crystal material is soaked in a sponge. In this PNLC type, the liquid crystal exists in a continuous fashion without forming droplets. In order for the liquid crystal display panels utilizing the polymer dispersed liquid crystal material and the polymer network liquid crystal material, respectively, to accomplish an image display, scattering and transmission of light must be controlled.

For the purpose of discussion of the present invention, the term PDLC (polymer dispersed liquid crystal) herein used is to be understood as including not only the polymer dispersed liquid crystal material, but also the polymer network liquid crystal material as well.

As a polymer matrix used in the polymer dispersed liquid crystal layer, any thermoplastic and thermosetting resin may be employed if and only if it is transparent, but a UV-curable resin is mostly employed therefor because of its excellent performance and because the liquid crystal panel can be manufactured using a method generally employed for the manufacture of the conventional liquid crystal panel. According to the popular method of making the conventional TN liquid crystal panel, a predetermined electrode pattern is formed on each of upper and lower substrates and these two substrates are subsequently overlapped with each other with the electrodes in one substrate aligned with those in the other substrate. At this time, spacers having a predetermined uniform size are sandwiched between these two substrates to keep the substrates spaced apart from each other by means of a sealing member of epoxy resin, thereby defining a liquid crystal chamber therebetween. Thereafter, a quantity of liquid crystal material is injected into the liquid crystal chamber between the substrates.

In order for the PDLC panel to be manufactured by the use of the above discussed known method generally used to manufacture the conventional TN liquid crystal panel, if a UV-curable resin, for example, a UV-curable acrylic resin, is employed as a polymer matrix, the resin exists in the form of a precursor of a relatively low viscosity such as a monomer and/or an oligomer and, since a blend of the UV-curable resin with the liquid crystal material (hereinafter referred to as a liquid crystal solution) has a fluidity sufficient to allow it to be injected at normal temperatures, and if the UV-curable resin is cured by UV radiation after the liquid crystal solution has been injected by the utilization of the conventional method of making the TN liquid crystal panel, to thereby phase separate only the liquid crystal material to form a polymer dispersed liquid crystal layer, the liquid crystal panel of a dispersed type can easily be formed.

The operation of the polymer dispersed liquid crystal will be briefly discussed with reference to FIGS. 18A and 18B, which are explanatory diagrams used to explain the operation of the polymer dispersed liquid crystal panel. In these figures, reference numeral 181 represents an array substrate; reference numeral 182 represents a pixel electrode; reference numeral 183 represents a counterelectrode; reference numeral 184 represents liquid crystal droplets; reference numeral 185 represents a polymer; and reference numeral 186 represents a counterelectrode substrate. The pixel electrode 182 is connected with a thin-film transistor (not shown) and others, and a voltage is applied to the pixel electrode by switching the thin-film transistor on and off to vary the direction of orientation of the liquid crystal material on the pixel electrode to thereby modulate light. When and so long as no voltage is applied as shown in FIG. 18A, the liquid crystal droplets 184 assume a random orientation. In this condition, a difference is created between the refractive index of the polymer 185 and that of the liquid crystal droplets 184, and the incident light is therefore scattered. Application of the voltage to the pixel electrode 182 results in uniform alignment of the liquid crystal material as shown in FIG. 18B. If the refractive index of the liquid crystal material when the latter is oriented in one predetermined direction is chosen to be equal to that of the polymer, the incident light emerges outwardly from the array substrate 181 without being scattered. It is to be noted that, when the liquid crystal material is expressed in the form of droplets such as exhibited by PDLC, the mean value of respective diameters of the liquid crystal droplets is referred to as the average particle size.

In order to convert the optical image, formed on the liquid crystal panel as a change in light scattering condition, into a change in luminance, a phenomenon is utilized in which, when only a portion of the light emerging outwardly from the liquid crystal panel, which portion is encompassed by a predetermined solid angle, is extracted, the amount of light encompassed by such predetermined solid angle varies depending on the light scattering condition. In general, a system is widely used in which light travelling towards a center of orientation by the use of an aperture is utilized. In other words, if the light scattering power increases, the amount of light emerging from the liquid crystal panel and incident on a projection lens decreases. Although this aperture type has a relatively simple structure and can provide a bright projected image, there is a problem in that the contrast ratio is not satisfactory. As one method to increase the contrast ratio, it is contemplated to reduce the solid angle in which the projection lens collects light, but this in turn reduces the brightness of the projected image.

Where the display panel is used under a bright environment, a reduction in contrast is considerable when affected by external light and the displayed image will no longer be recognized. In the case of the TN liquid crystal panel which is featured in that polarized light is emitted therefrom, use has been made of a polarizing screen to minimize the reduction in contrast which would occur when affected by the external light, so that the displayed image can be sufficiently recognized even under a bright environment. Where the displayed image is to be projected onto the polarizing screen, the polarizing plate disposed on the exit side of the TN liquid crystal panel must have an axis of polarization held in alignment with that of the polarizing screen. Unless the respective axes of polarization are aligned with each other, the displayed image will be darkened. Once the axis of polarization of the polarizing plate of the TN liquid crystal panel and that of the polarizing screen have been fixed, it can no longer be changed. On the other hand, since light projected by a liquid crystal projection device which utilized as a light valve the liquid crystal panel capable of forming an optical image as a function of change in light scattering condition is natural light, the influence brought about by external light cannot be suppressed even though the polarizing screen is employed.

Where projection of an image is made in a place rich in external light, the TN liquid crystal panel is effective to suppress the reduction in contrast if the polarizing screen is employed. However, where projection of an image is made in a place substantially free from external light, the feature of the polarizing screen cannot be best utilized, and the brightness will be so insufficient that projection of a large-format image cannot be accomplished.

The TN liquid crystal panel has additional problems associated with orientation and polarization. If orientation is irregular in the TN liquid crystal panel, linearly polarized light which has passed through the polarizing plate on the incident side of the TN liquid crystal panel will not be rotated 90° as it passes through the liquid crystal panel accompanied by a reduction in transmittance at the polarizing plate on the exit side of the liquid crystal panel and/or light leakage resulting from a reverse domain generated under the influence of a transverse electric field developed between the signal lines and the pixel electrodes.

SUMMARY OF THE INVENTION

The present invention is intended to improve the contrast of an image exhibited by a projection device and a display device both utilizing a liquid crystal panel of a type capable of forming an optical image as a function of changes in light scattering condition.

To this end, a liquid crystal projection device of the present invention includes a light generating means, a liquid crystal panel capable of forming an optical image as a function of change in light scattering condition, a polarizing means disposed on at least one of incident and exit sides of the liquid crystal panel, and a projecting means for projecting the optical image. The polarizing means is so disposed as to be removed from the relevant side of the liquid crystal panel.

Where the polarizing means is disposed on each of the incident and exit sides of the liquid crystal panel, the polarizing means on the incident side of the liquid crystal panel and that on the exit side of the liquid crystal panel must have their respective axes of polarization substantially aligned with each other. Where the polarizing means is disposed only on the incident side of the liquid crystal panel, use is made of a polarizing screen which should be placed with its axis of polarization substantially aligned with the axis of polarization of the polarizing means by rotating the polarizing means on the incident side of the liquid crystal panel about an optical axis of a projection optical system.

Hereinafter, details will be described in connection with the projection device utilizing the polymer dispersed liquid crystal panel as a light valve.

Assuming that the polarizing element is mounted on the incident side of the polymer dispersed liquid crystal panel, and where light emitted from a light source is natural light, half of the light emitted from the light source is absorbed by the polarizing element disposed on the incident side of the liquid crystal panel and is incident on the liquid crystal panel as polarized light. When the liquid crystal panel is in a transparent condition with a voltage applied thereto, the polarized light incident on the liquid crystal panel exits therefrom and travels towards a polarizing screen through a projection lens. If the axis of polarization of the polarizing element is substantially aligned with that of the polarizing screen, the light reaching the polarizing screen will not be absorbed. Accordingly, the brightness of the image on the screen is about ½ of that exhibited when no polarizing element is employed.

On the other hand, when the liquid crystal panel is in a light scattering condition with no voltage applied thereto, the polarized light incident on the liquid crystal panel scatters and emerges outwardly therefrom with its direction of polarization being random before it reaches the polarizing screen through the projection lens. A light component vibrating in a direction perpendicular to the axis of polarization of the polarizing screen is then absorbed by the polarizing screen. If the liquid crystal panel is in a completely scattering condition, the brightness of the image on the screen will be about ¼ of that exhibited when no polarizing element is employed.

In addition, since even if influenced by external light about ½ of that is absorbed by the polarizing screen, any possible reduction in contrast which would occur under the influence of external light can be suppressed.

On the other hand, let it be assumed that the polarizing element is disposed on both of the incident and exit sides of the polymer dispersed liquid crystal panel with the axis of polarization of the polarizing element on the incident side substantially aligned with that on the exit side. In this case, if light emitted from a light source is natural light, half of the light emitted from the light source is absorbed by the polarizing element on the incident side of the liquid crystal panel and is incident on the liquid crystal panel as polarized light.

When the liquid crystal panel is in a transparent condition with a voltage applied thereto, the polarized light incident on the liquid crystal panel then exits therefrom and, since the axis of polarization of the polarizing element on the exit side is aligned with the direction of vibration of the light emerging therefrom, travels towards a polarizing screen through a projection lens. Accordingly, the amount of the light reaching the screen is about ½ of that exhibited when no polarizing element is employed.

However, when the liquid crystal panel is in a light scattering condition with no voltage applied thereto, the polarized light incident on the liquid crystal panel scatters and emerges outwardly therefrom with its direction of polarization being random before it reaches the polarizing screen through the projection lens. A light component vibrating in a direction perpendicular to the axis of polarization of the polarizing element on the exit side is then absorbed by the polarizing element on the exit side and only the remaining light traveling along the axis of polarization of the polarizing element on the exit side reaches the screen. If the liquid crystal panel is in a completely scattering condition, the amount of the light reaching the screen will be about ¼ of that exhibited when no polarizing element is employed.

Where the liquid crystal panel gives rise to a black display when in the scattering condition and a white display when in the transparent condition, the contrast will be about twice that exhibited with no polarizing element employed, for the foregoing reason. This is also true even if the screen used is not a polarizing screen. Also, if it is used in combination with the polarizing screen and if the axis of polarization of the polarizing screen is substantially aligned with the axis of polarization of any one of the polarizing elements on the incident and exit sides of the liquid crystal panel, reduction in contrast which would occur under the influence of external light can be suppressed. This is because, although the light emitted from the projection device is not absorbed by the polarizing screen, half of the external light is absorbed by the polarizing screen.

In view of the foregoing, according to the present invention, in the projection device in which the liquid crystal panel capable of forming an optical image as a function of change in light scattering condition is used, arrangement has been made that the polarizing plate can be removably mounted on the incident side, or both of the incident and exit sides, of the liquid crystal panel so that, when the polarizing plate is mounted on the incident side, the contrast can be increased if combined with a polarizing screen, but if the polarizing plate is mounted on each of the incident and exit sides, the contract can be increased even if no polarizing screen is employed.

Also, a reduction in contrast which would occur under the influence of external light can be suppressed if the image is projected onto the polarizing screen. Moreover, since the polarizing plate is supported for rotation, it is possible to align the axis of polarization of the light emerging outwardly from the projection device with that of the polarizing screen regardless of the orientation of the axis of polarization of the polarizing screen, making it possible to utilize the polarizing screen having its axis of polarization oriented in any direction.

Yet, in a place where no influence of external light is apparent, the polarizing plate may be removed and, even in this case, a bright display of image can be obtained, thus making it possible to accomplish adjustment according to the environment.

Similarly, even in the liquid crystal display device utilizing the liquid crystal panel capable of forming an optical image as a function of changed in light scattering condition, the polarizing plate is to be removably disposed on each of the incident and exit sides of the liquid crystal panel where it employs a back lighting, and outside the liquid crystal panel where the latter is of a reflective type in which external light is reflected to provide a viewable image, to thereby increase the contrast.

BRIEF DESCRIPTION OF THE DRAWINGS

The above and other objects and features of the present invention will become clear from the following description taken in conjunction with preferred embodiments thereof with reference to the accompanying drawings, in which like parts are designated by like reference numerals, and in which:

FIGS. 5 to 7 are schematic diagrams showing the liquid crystal projection device according to second to fourth preferred embodiments of the present invention, respectively;

DETAILED DESCRIPTION OF THE EMBODIMENT

Figure 1:
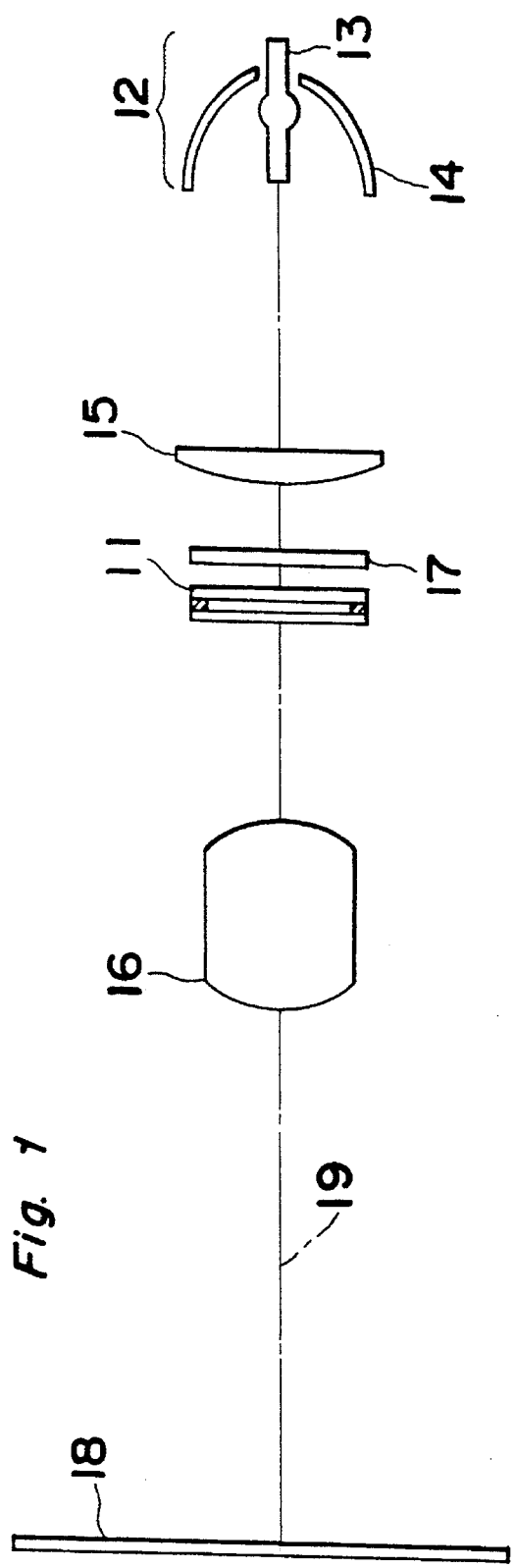
FIG. 1 is a schematic diagram showing one example of a liquid crystal projection device according to a first preferred embodiment of the present invention.

Referring first to FIG. 1, reference numeral 11 represents a polymer dispersed liquid crystal panel; reference numeral 12 represents a light source; reference numeral 16 represents a projection lens; reference numeral 17 represents a polarizing plate; and reference numeral 18 represents a polarizing screen.

The light source 12 serving as a light generating means includes a lamp 13 and a concave mirror 14. Rays of light emitted by the lamp 13 are converged by the concave mirror 14 to provide a relatively narrowly oriented beam of natural light therefrom. The lamp 13 may be a halogen lamp, a xenon lamp, a metal halide lamp or the like, but in the illustrated embodiment a metal halide lamp is employed because of a high luminance, a high lifetime and low electric power consumption. The rays of light from the light source 12 pass through a field lens 15 and are subsequently polarized by the polarizing plate 17 to provide linearly polarized light which subsequently impinges upon the liquid crystal panel 11. The field lens 15 is used to diffract a portion of light passing through a peripheral portion of a display area of the liquid crystal panel 11 inwardly to permit it to enter the pupil of the projection lens, thereby avoiding a possible darkening of a peripheral portion of an image projected onto the screen 18.

The liquid crystal panel 11 is operable in response to a video signal to form an optical image thereon in the form of a change in light scattering condition. The projection lens 16 serves to extract that portion of light emerging from the various pixels which is encompassed within a predetermined solid angle. Since if a light scattering condition of the light emerging from each pixel varies, the amount of light encompassed within the predetermined solid angle varies, the optical image formed on the liquid crystal panel 11, as a function of changes in light scattering condition, is converted by the projection lens 16 into a change in illuminance on the polarizing screen 18. The optical image so formed on the liquid crystal panel is projected by the projection lens 16 onto the polarizing screen 18 to form a viewable image on an enlarged scale.

The polarizing plate 17 is removable, and the polarizing plate 17 when used is disposed on an incident side of the liquid crystal panel 11 adjacent the light source 12 with the direction of the axis of polarization thereof being adjustable about an optical axis 19. So long as the polarizing plate 17 is mounted as shown in FIG. 1, linearly polarized light enters the liquid crystal panel 11. The liquid crystal panel 11 is in a light scattering condition when no electric field is applied, thereby displaying black. In this light scattering condition, the incident light is emitted in a random direction and, at this time, the direction of polarization is random as well and, accordingly, even if the linearly polarized light impinges upon the liquid crystal panel 11 such as in the present invention, the direction of polarization of light emerging outwardly from the liquid crystal panel 11 is random. This tendency is considerable with an increase in the scattering characteristic of the liquid crystal panel 11, and if the liquid crystal panel 11 is in a completely dispersing condition, about 50% of the light emerging from the liquid crystal panel 11 is converted in a direction perpendicular to the direction of polarization of the incident light. On the other hand, when an electric field is applied to the liquid crystal panel 11, the liquid crystal panel 11 assumes a transparent condition, thereby displaying white. In this transparent condition, since no direction of polarization changes, the direction of polarization of the incident light is preserved and the light emerges in the same direction of polarization.

When the polarizing plate 17 is mounted, the polarizing plate 17 has to be rotated so that the direction of the axis of polarization thereof is substantially aligned with the direction of the axis of polarization of the polarizing screen 18. When the optical image is projected onto the polarizing screen 18 after this adjustment, the randomly polarized light scattered during a black display as hereinabove described reaches the polarizing screen 18 with about half of it being absorbed. On the other hand, during a white display, the light polarized in a direction matching with the direction of the axis of polarization of the polarizing screen reaches the polarizing screen and, therefore, no light is absorbed by the polarizing screen. Accordingly, the brightness may be reduced by the polarizing plate down to a half value, but a display having a contrast twice that can be projected. Also, where the projection is carried out under a bright environment, the contrast may be considerably reduced as external light reflects from the screen. Therefore, if the polarizing screen 18 is employed, half of the external light can be absorbed, thereby suppressing the reduction in contrast which would occur under the influence of the external light. On the other hand, where a bright display is desired, the polarizing plate 17 has to be removed and an image is to be projected onto a non-polarizing screen used in place of the polarizing screen 18.

Figure 2A:
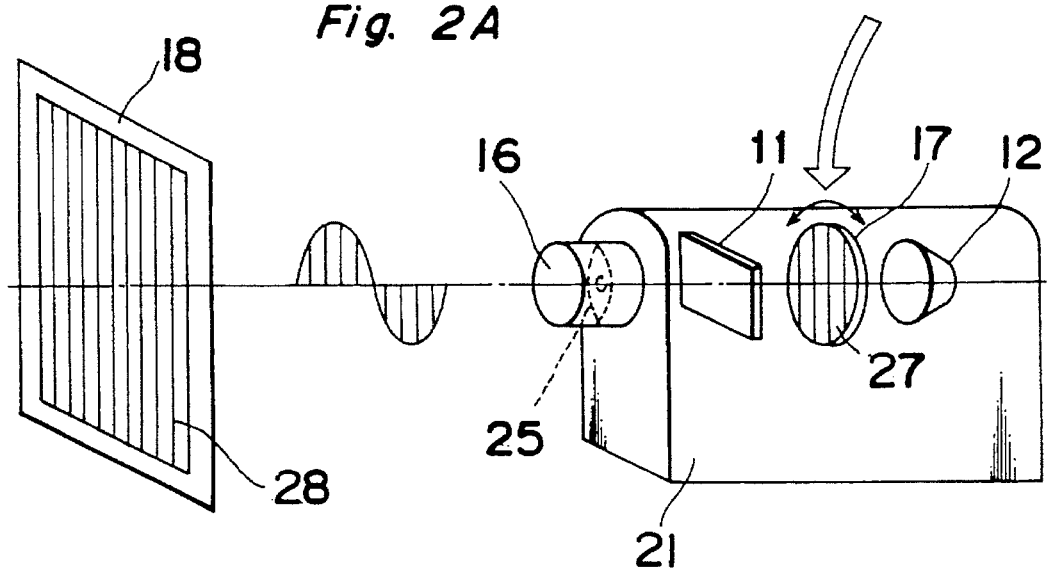
FIGS. 2A–2B are a schematic perspective view of another example of the liquid crystal projection device according to the first preferred embodiment of the present invention.

The details will be discussed with reference to FIG. 2. FIG. 2A illustrates schematically a front type liquid crystal projection device according to the present invention which is separate from a screen. It is to be noted that although the appended claims recite the use of a polarizing screen, it should be understood that such a front type as shown in FIG. 2 is included therein.

Figure 2B:
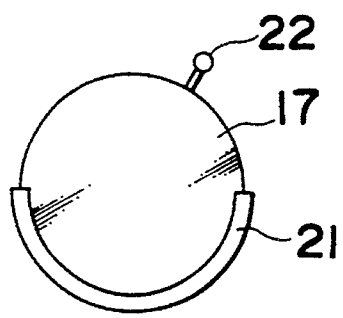

As best shown in FIG. 2B, the polarizing plate 17 has a round or arcuate outer periphery and is so designed as to be rotatable in contact with a guide means 21. The guide means 21 is of a semi-circular or arcuate configuration including a generally U-shaped groove for removably receiving the polarizing plate 17. When the polarizing plate 17 is to be mounted, the polarizing plate 17 is mounted on the guide means 21 with its edge received in the groove in the guide means 21. The polarizing plate 17 has a lever 22 fixedly mounted thereon so as to protrude radially outwardly therefrom and, when the lever 22 is manually moved to rotate the polarizing plate 17 so that the axis of polarization 27 of the polarizing plate 17 is substantially aligned with the axis of polarization 28 of the polarizing screen 18. The contrast of the displayed image will increase twofold, although the brightness will be reduced by about 50% as compared with the case in which no polarizing plate 17 is employed. Also, the light emerging outwardly from the projection device 21 is reflected without being absorbed by the polarizing screen 18, half of the external light is absorbed by the screen with the consequence that the amount of light reflected therefrom is about 50%, and any possible reduction in contrast can therefore be suppressed. Also, even though the direction 28 of the axis of polarization of the polarizing screen 18 is not fixed, the direction 27 of the axis of polarization of the polarizing plate 17 and the direction 28 of the axis of polarization of the polarizing screen 18 can be substantially aligned with each other by fixing the polarizing plate 17, being then rotated, at a position where the brightest display can be obtained.

In addition, if the diameter of an aperture 25 within the projection lens 16 is made variable, the light collecting angle of the projection lens 16 can be adjusted so that the brightness can be adjusted according to the contrast. On the other hand, where the liquid crystal projection device of the present invention is used to project images under a dark environment where influence brought about by the external light is minimal, the polarizing plate 17 is to be removed and a non-polarizing screen should be used in place of the polarizing screen 18. Since when projected onto the polarizing screen about 50% of light will be absorbed by the screen, the image displayed will be darkened.

In the projection device in which the TN liquid crystal panel is used as a light valve, alignment with the axis of polarization of the polarizing screen by rotating the polarizing plate is difficult to achieve. This is because the axis of polarization of the polarizing plate disposed on each of the incident and exit sides of the TN liquid crystal panel lies parallel or perpendicular to the axis of rubbing of the TN liquid crystal panel. Accordingly, if in the TN liquid crystal panel the axis of polarization of the polarizing plate is rotated, no light modulation is possible. In the projection device of the present invention, a polymer dispersed liquid crystal panel 11 is employed so that light modulation can be carried out by scattering the incident light. The polarizing plate 17 merely has a function of converting the exit light into polarized light and there is no limitation to disposition of the axis of polarization thereof. Accordingly, by rotating the polarizing plate 17, adjustment for aligning it with the axis of polarization of the polarizing screen 18 is possible.

While in the present invention a polarizing plate has been used which is in the form of a film prepared by impregnating a resin of polyvinyl alcohol or the like with iodine and then stretching it, any other polarizing element, such as a polarizing beam splitter, may be employed.

Figure 3:
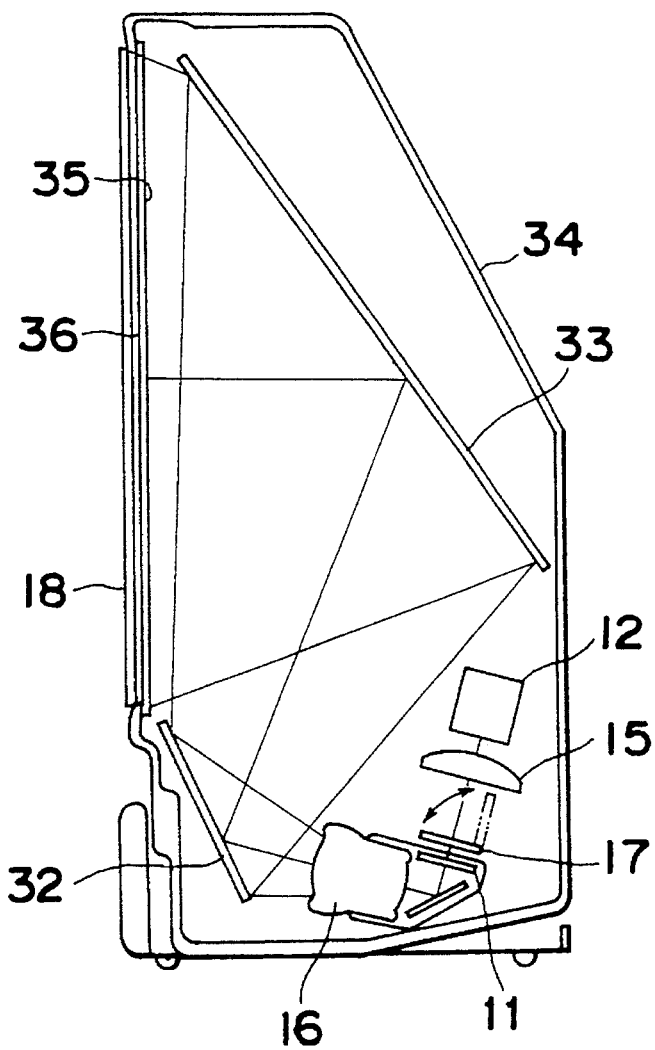
FIG. 3 is a schematic side sectional view of a further example of the liquid crystal projection device according to the first preferred embodiment of the present invention.

Also, although FIGS. 1 and 2 illustrate the front type, in which the projection device and the screen are separate from each other, the present invention may be equally applicable to a rear type projection device in which, as shown in FIG. 3, the screen and the projection device are integrated together.

The polarizing screen 18 used in the front type is of a structure in which a polarizing plate and a reflecting plate such as an aluminum plate are bonded together in face-to-face relationship. However, the polarizing screen 18 used in the rear type is of a structure in which a polarizing plate, a lenticular lens plate 36 and a Fresnel lens plate 35 are joined together in face-to-face relationship. Since in the case of the screen used in the rear type no switching or replacement between a polarizing screen and a non-polarizing screen is possible, an arrangement may be made such that a transparent plate plated with a film of polarizing elements may be removably fitted to an outermost layer of the screen. Alternatively, a roll wound with a sheet having a film of polarizing element may be disposed on one side of the screen so that the sheet can be selectively drawn out from and wound onto the roll.

In this case, since the direction of the axis of polarization of the polarizing screen 18 is pre-fixed, the polarizing plate 17 need not be rotated. The polarizing plate 17 is of a shape similar to the shape of an effective display area of the liquid crystal panel 11 and has one side coupled by means of a rotatable hinge so that it can be driven by an electric motor. Thus, by selectively switching the motor on and off, the polarizing plate 17 can be brought into and out of alignment with the optical path as shown in FIG. 3.

Referring to FIG. 3, the beam emerging outwardly from the projection lens 16 is, after having been deflected by a mirror 32 and then another mirror 33, projected onto the polarizing screen 18. The Fresnel lens plate 35 and a lenticular lens plate 36 are disposed in face-to-face relation to and rearwardly of the polarizing screen 18 for controlling the directionality of the projected beam.

Figure 4:
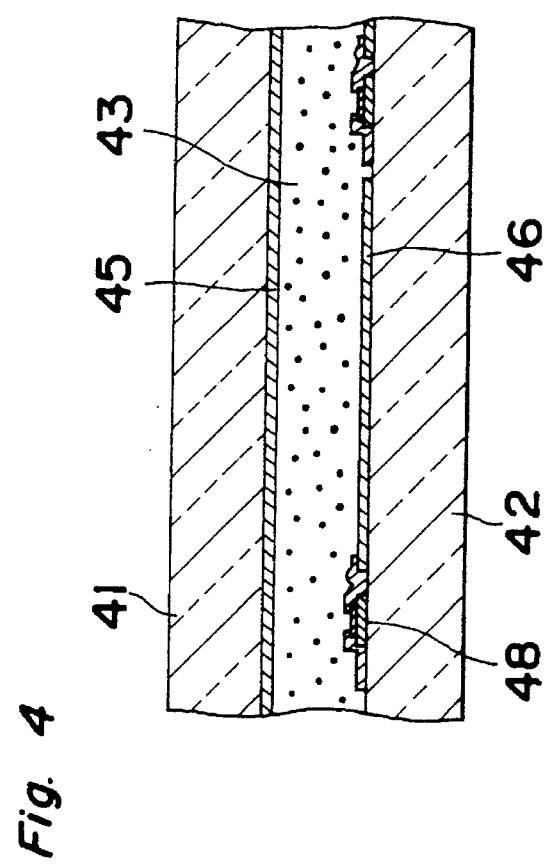
FIG. 4 is a sectional view, on an enlarged scale, of a polymer dispersed liquid crystal panel employed in the liquid crystal projection device of the present invention.

The liquid crystal panel is of a structure including, as best shown in FIG. 4, two transparent substrates 41 and 42 with a layer of polymer dispersed liquid crystal material 43 sandwiched therebetween. Respective surfaces of the substrates 41 and 42 adjacent the polymer dispersed liquid crystal layer 43 are formed with transparent counterelectrodes 45 and transparent pixel electrodes 46. The pixel electrodes 46 are disposed in a matrix pattern and a thin-film transistor 48 as a switching element is disposed with each neighboring pixel electrode 46. Each thin-film transistor 48 is connected with a source signal line (not shown) and also with a gate signal line (also not shown), the source and gate signal lines being in turn connected with a signal supply circuit and a scanning circuit, respectively, so that a signal voltage can be applied to the corresponding pixel. The polymer dispersed liquid crystal layer 43 transmits the incident light straightforward when applied with a sufficient electric field, but scatters the incident light when not applied with an electric field, and therefore, it is possible to control the light scattering condition of respective portions of the liquid crystal layer corresponding to the pixels according to the applied voltage.

The liquid crystal material which may be employed in the liquid crystal panel of the present invention my preferably be nematic liquid crystal, smectic liquid crystal or cholesteric liquid crystal, which may contain one or a mixture of two or more liquid crystal compounds and/or material other than the liquid crystal compounds. A polymer matrix my be a transparent polymer such as, for example, thermoplastic resin, thermosetting resin or light-curable resin. However, the use of a UV-curable resin is most preferred because the UV-curable resin is easy to manufacture and susceptible to phase separation from the liquid crystal phase. Examples of the polymer matrix include UV-curable acrylic resin which may preferably contain an acrylic monomer or an acrylic oligomer which is easy to cure upon polymerization initiated when radiated by UV-rays of light.

Examples of the polymer forming monomer include 2-ethylhexyl acrylate, 2-hydroxyethyl acrylate, neopentyl glycol acrylate, hexanediol diacrylate, diethylene glycol diacrylate, tripropylene glycol diacrylate, polyethylene glycol diacrylate, trimethylolpropane triacrylate, penteerythritol acrylate, and others.

Examples of the oligomer or prepolymer include polyester acrylate, epoxy acrylate, polyurethane acrylate and others.

Also, to facilitate polymerization, a polymerization initiator may be added, examples of which include 2-hydroxy-2-methyl-1-phenylpropane-1-A ("DAROCURE 1173" available from Merc), 1-(4-isopropylphenyl)-2-hydroxy-2-methylpropane-1-A ("DAROCURE 1116" available from Merc), 1-hydroxy clohexyl phenylketone ("ILGACURE 184" available from Ciba-Geigy, Ltd.), benzil methylketal ("ILGACURE 651" available from Ciba-Geigy, Ltd.) and others. If desired, one or more of a chain transfer agent, a sensitizer, dyes, cross-linking agent may be employed.

If a color filter having three primary colors, red, green and blue, is disposed on respective counterelectrodes 45 aligned respectively with the pixel electrodes 46 shown in FIG. 4, a color liquid crystal panel capable of providing a color image display can be obtained. Therefore, if this color liquid crystal panel is employed, a liquid crystal projection device capable of providing a color image display can be obtained.

The structure of the liquid crystal projection device according to a second preferred embodiment of the present invention will be described with reference to FIG. 5. As shown in FIG. 5, reference numeral 51 represents a polymer dispersed liquid crystal panel; reference numeral 52 represents a light source; reference numeral 56 represents a projection lens; reference numeral 57 represents a polarizing plate; and reference numeral 58 represents a polarizing screen. These component parts are similar to those in the first preferred embodiment of the present invention.

Reference numeral 50 represents a transparent plate; reference numeral 53 represents a first lens array; reference numeral 54 represents a second lens array; reference numeral 59 represents a projection aperture provided in the projection lens 56; and reference numeral 60 represents a light source aperture disposed adjacent the light source 52.

While description of the component parts of the projection device shown in FIG. 5 which function in a manner similar to those in the first preferred embodiment of the present invention will not be reiterated for the sake of brevity, the transparent plate 50 is bonded by the use of a transparent bonding agent to an exit side substrate of a liquid crystal panel 51, that is, one of the two substrates of the liquid crystal panel 51 adjacent the projection lens 56. Ideally, it is preferred that the transparent plate 50 has a refractive index which is equal to that of the transparent bonding agent and in turn to that of the exit side substrate of the liquid crystal panel 51 so that no optical interface exist. This condition of bonding is hereinafter referred to as an optical coupling. The transparent plate 50 is in the form of a glass plate of 10 mm in thickness and has its side face (ineffective face) painted black and also has an effective area of an exit side surface thereof formed with an anti-reflection film.

Instead of the glass plate, a transparent resin such as, for example, acrylic resin my be employed for the transparent plate 50. The transparent bonding agent may be a transparent bonding agent of epoxy resin or a bonding agent of transparent silicone resin which can be gelated when exposed to UV-rays of light. Also, in place of the transparent bonding agent, a liquid medium such as ethylene glycol may be used for accomplishing an optical coupling between the transparent plate 50 with the exit side substrate of the liquid crystal panel. However, care must be taken to avoid any possible of inclusion of air bubbles between the exit side substrate of the liquid crystal panel and the transparent plate 50, or inclusion of the air bubbles will result in an abnormality in image quality.

In this construction, since the thickness from the polymer dispersed liquid crystal layer to the interface which contacts the ambient air increases and since that portion of scattered light emerging from the liquid crystal layer which returns inwardly as it is reflected by an exit side surface of the transparent plate 50 is absorbed by the side face of the transparent plate 50, the amount of light returning to the liquid crystal layer decreases. An increase in luminance resulting from a so-called secondary scattering in which light reflected so as to travel backwardly is scattered is minimized as compared with the case in which the transparent plate 50 is not employed. Thus, the contrast of the displayed image is advantageously increased.

The transparent plate 50 may be coupled with an incident side substrate of the liquid crystal panel 51. Preferably, the transparent plate 50 is coupled with each of the incident and exit side substrates of the liquid crystal panel 51.

The first lens array 53 is an aggregation of microlenses and is operable to form a plurality of secondary images of the light source 52. The second lens array 54 is disposed at the position where the secondary images of the light source 52 are formed by the first lens array 53, so that the liquid crystal panel 51 can be illuminated. The aggregation of the microlenses forming the first lens array 53 have a shape similar to the shape of the effective display area of the liquid crystal panel 51. Each lens of the second lens array 54 forms a rectangular image of the corresponding microlens of the first lens array 53 on the liquid crystal panel 51. Accordingly, it serves as an integrator which superimpose rays of light emitted from the secondary images of the light source formed by the first lens array 53 on the liquid crystal panel. By so doing, a display of the projected image that is bright over the entire surface thereof can be obtained.

To remove unnecessary rays of light, the light source aperture 60 is disposed adjacent the second lens array 54. This light source aperture 60 has an opening corresponding to the secondary images of the light source so that the secondary images of the light source formed by the first lens array 53 can pass therethrough effectively. The projection aperture 59, having an opening similar in shape to the shape of the opening of the light source aperture 60, is disposed at a position adjacent the pupil of the projection lens 56. With these apertures 59 and 60, unnecessary scattered light which occurs during a black display can be eliminated and, since during the white display no substantial loss of light occurs, the contrast can be increased.

The optical coupling and the integrator both referred to above may be employed independently.

FIG. 6 illustrates the projection device according to a third preferred embodiment of the present invention. In FIG. 6, reference numeral 61 represents a polymer dispersed liquid crystal panel; reference numeral 62 represents a light source; reference numeral 66 represents a projection lens; reference numerals 67 and 69 represent respective polarizing plates; and reference numeral 68 represents a polarizing screen.

In this third preferred embodiment of the present invention, the polarizing plates 67 and 69 are disposed on incident and exit sides of the liquid crystal panel 61. Also, as is the case with the previous embodiment, the polarizing plates 67 and 69 are removable and rotatable.

As described in connection with the first preferred embodiment of the present invention, polarized light incident on the liquid crystal panel 61 when the latter is in the light scattering condition emerges outwardly therefrom as randomly polarized light and, therefore, about half of it is absorbed by the exit side polarizing plate. On the other hand, polarized light incident on the liquid crystal panel 61 when the latter is in the transparent condition emerges outwardly from the liquid crystal panel 61 in the form as it has entered through the liquid crystal panel 61, and therefore, if the direction of the axis of polarization of the incident side polarizing plate 67 and that of the exit side polarizing plate 69 are aligned with each other, no light is absorbed by the exit side polarizing plate 69. Accordingly, as compared with the case in which the polarizing plates 67 and 69 are not mounted, a contrast which is twice as high as that case can be obtained. By so doing, a high contrast display can be obtained even though the screen is not a polarizing screen. In addition, when used in combination with the polarizing screen 68, reduction in contrast which would result from the influence brought about by external light under a bright environment can be advantageously suppressed. It is, however, to be noted that, in such a case, it is necessary to align the direction of the axis of polarization of the polarizing plate 67 substantially with that of the polarizing plate 69.

Where a brighter display is desired, the polarizing plates 67 and 69 are to be removed and the image should be projected onto a non-polarizing screen. Where a high contrast display is desired, the polarizing plates 67 and 69 are to be mounted and the respective directions of the axes of the polarizing plates 67 and 69 are to be substantially aligned with each other by rotating the individual polarizing plates 67 and 69.

When the polarizing plates 67 and 69 are to be rotated, it is preferred that they are so supported that they can be rotated while keeping a substantially parallel relationship between the axis of polarization of the polarizing plate 67 and that of the polarizing plate 69. If the substantially parallel relationship referred to above is considerably destroyed, it will become difficult to achieve a white display or a black display, accompanied by reduction in display contrast.

Figure 7:
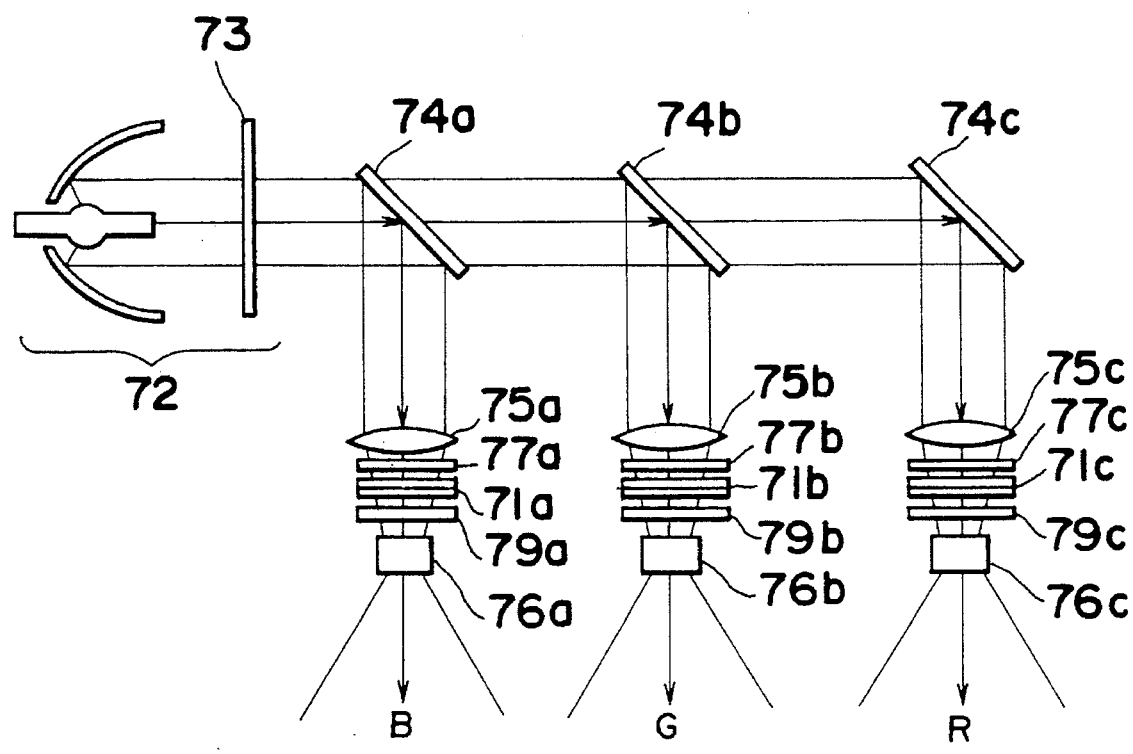

FIG. 7 illustrates the liquid crystal projection device according to a fourth preferred embodiment of the present invention. Referring to FIG. 7, reference numerals 71a, 71b and 71c represents respective liquid crystal panels; reference numeral 72 represents a light source; reference numerals 75a, 75b and 75c represent respective field lenses; reference numerals 76a, 76b and 76c represent respective projection lenses; reference numeral 74a represents a blue light reflecting dichroic mirror (BDM); reference numeral 74b represents a green light reflecting dichroic mirror (GDM); reference numeral 74c represents a red light reflecting dichroic mirror (RDM); reference numerals 77a, 77b and 77c represent respective incident side polarizing plates; and reference numerals 79a, 79b and 79c represent respective exit side polarizing plates.

Each of the liquid crystal panels 71a, 71b and 71c is in the form of a polymer dispersed liquid crystal panel of a structure identical with that shown in FIG. 4.

The light source 72 is constituted by a lamp and a concave mirror. The lamp used is a metal halide lamp which emits rays of light containing red, green and blue components. The concave mirror is made of glass and has a reflecting surface formed by depositing a multi-layered film effective to reflect visible rays of light and transmit infrared rays of light.

Visible rays of light contained in radiations from the lamp are reflected by the reflecting surface of the concave mirror and the reflected light assumes a parallel light form, which is emitted from the light source 72.

A UVIR cut-off filter 73 is a glass substrate formed with a multi-layered film effective to transmit visible rays of light on a glass substrate and to reflect both infrared and UV rays of light.

White light emitted from the light source 72 passes through the UVIR cut-off filter 73, by which infrared and UV components contained in the white light are removed. The light emerging from the UVIR cut-off filter 73 subsequently impinges upon the BDM 74a which reflects only a blue light component towards the liquid crystal panel 71a. The other light having passed through the BDM 74a impinges upon the GDM 74b which reflects only a green light component towards the liquid crystal panel 71b. The remaining light having passed through the GDM 74b impinges upon the RDM 74c, which reflects it towards the liquid crystal panel 71c. In this way, the light from the light source is separated into three color components. The liquid crystal panels 71a, 71b and 71c operate in response to video signals applied thereto to form respective optical images as a function of change in this light scattering condition, which optical images are subsequently projected by the associated projection lenses 76a, 76b and 76c onto the screen (not shown) so as to superimpose one image over the other. It is to be noted that the specific layout of the BDM 74a, GDM 74b and RDM 74c may not be always limited to that shown and that, in place of the RDM 74, a total reflection mirror may be employed.

All of the incident side polarizing plates 77a, 77b and 77c and the exit side polarizing plates 79a, 79b and 79c are removable and rotatable so as to adjust the direction of the axis of polarization. Where a bright display is desired, the incident and exit side polarizing plates 77a to 77c and 79a to 79c are to be removed and a non-polarizing screen should be used to present the projected image.

Where the incident and exit side polarizing plates 77a to 77c and 79a to 79c are mounted, the respective directions of axes of polarization thereof must be aligned with the direction of the axis of polarization of the polarizing screen. The operation of the liquid crystal projection device of the present invention in this case will now be described in detail. It is, however, to be noted that, since respective modulating systems for the red, green and blue light components are identical with each other, reference will be made only to the modulating system for the blue light component.

In the first place, the blue light reflected by the BDM 74a is condensed by the field lens 75a and subsequently enters the incident side polarizing plate 77a. As this blue light passes through the incident side polarizing plate 77a, about 50% of it is absorbed by the incident side polarizing plate 77a and enters the liquid crystal panel 71a in the form of polarized light. The liquid crystal panel 71a controls the incoming light with its scattering and transmissive conditions controlled by a signal. When the liquid crystal panel 71a is in the light scattering condition, the incident polarized light scatters and emerges outwardly therefrom with its direction of polarization being random. Then, about 50% of the light emerging outwardly from the liquid crystal panel 71a is absorbed by the exit side polarizing plate 79a. Of the rays of light having passed through the exit side polarizing plate 79a, only a portion thereof encompassed by the light collecting angle of the projection lens 76a reaches the screen. On the other hand, when the liquid crystal panel 71a is in the light transmissive condition, the incident polarized light emerges outwardly therefrom with no direction of polarization having been changed and, without being absorbed by the exit side polarizing plate 79a, subsequently reaches the screen through the projection lens 76a. By so doing, an image of a contrast which is about twice that exhibited when the polarizing plates 77a and 79a are removed can be obtained. Similarly, the liquid crystal panel 71b modulates the green light component, and the liquid crystal panel 71c modulates the red light components, the modulated light from the liquid crystal panels 71b and 71c being subsequently projected through the associated projection lenses 76b and 76c onto the screen so as to superimpose the resulting image one over the other. In this way, a color image of a favorable contrast is displayed. Also, since the polarizing screen is effective to reduce about 50% of the external light reflected thereby, any possible reduction in contrast in a bright environment can be suppressed.

Where the influence brought about by the external light is minimal, use may be made of a non-polarizing screen instead of the polarizing screen, and even in this case a higher contrast can be obtained. Where an image is to be projected onto the non-polarizing screen, there will be no problem of the direction of the axis of polarization of each of the incident side polarizing plates disposed on the incident side of the corresponding liquid crystal panels for modulating the red, green and blue light components being aligned with the direction of the axis of polarization of the associated exit side polarizing plate disposed on the exit side of the corresponding liquid crystal panel. It is, however, to be noted that care must be taken since, where a dichroic mirror is employed, characteristics vary depending on the direction of polarization. If no limitation is found, the utilization of S-polarized light (polarized light vibrating in a direction perpendicular to the sheet of FIG. 7) as viewed from the dichroic mirror will bring about a favorable color purity. This equally applies to the subsequent embodiments or examples of the present invention in which a dichroic mirror is employed.

Figure 8:
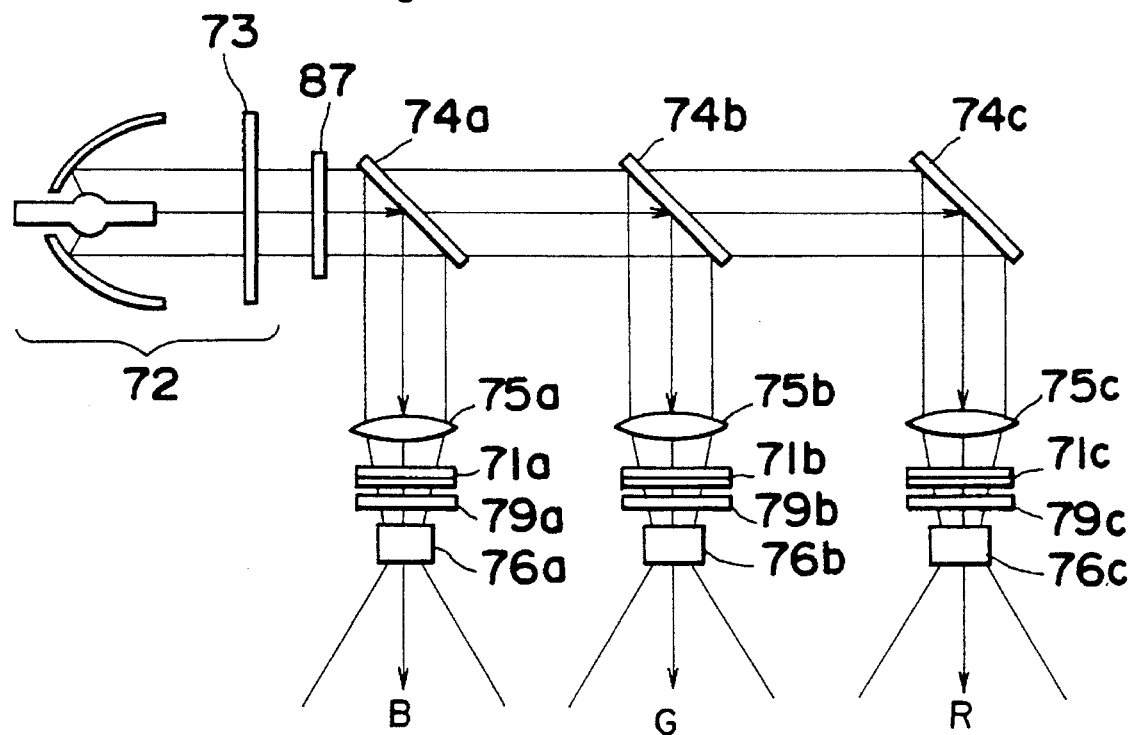
FIG. 8 is a schematic diagram showing a different structure of the liquid crystal projection device according to the fourth preferred embodiment of the present invention.

It is also to be noted that, as is the case with the first preferred embodiment of the present invention, only the incident side polarizing plates 77a, 77b and 77c may be used in combination with the use of the polarizing screen. Also, instead of the use of the incident side polarizing plates 77a, 77b and 77c, a single incident side polarizing plate 87 may be employed as shown in FIG. 8, in which the polarizing plats 87 is disposed between the UVIR cut-off filter 73 and the dichroic mirror 74a, i.e., at a position before the light from the light source 72 is color separated by the dichroic mirrors.

Since the three liquid crystal panels 71a, 71b and 71c are used for modulating the blue, green and red light components, respectively, a projected image having a satisfactory brightness and satisfactory resolution can be obtained. However, the light scattering characteristic of the polymer dispersed liquid crystal material has a wavelength dependency and is therefore insufficient, particularly with regard to the red light component. Accordingly, it is preferred to equalize the respective light scattering characteristics of those liquid crystal panels 71a, 71b and 71c with each other by choosing the film thickness of, or the particle size of the liquid crystal material used in, at least one of the liquid crystal panels 71a, 71b and 71c which is different from those of the remaining liquid crystal panels. In the liquid crystal projection device of the present invention, the liquid crystal panel 71c for modulating the red light component has a liquid crystal layer which is greater than that of the remaining liquid crystal panels 71a and 71b so as to equalize the light scattering characteristic of the liquid crystal panel 71c to those of the liquid crystal panels 71a and 71b.

Figure 9:
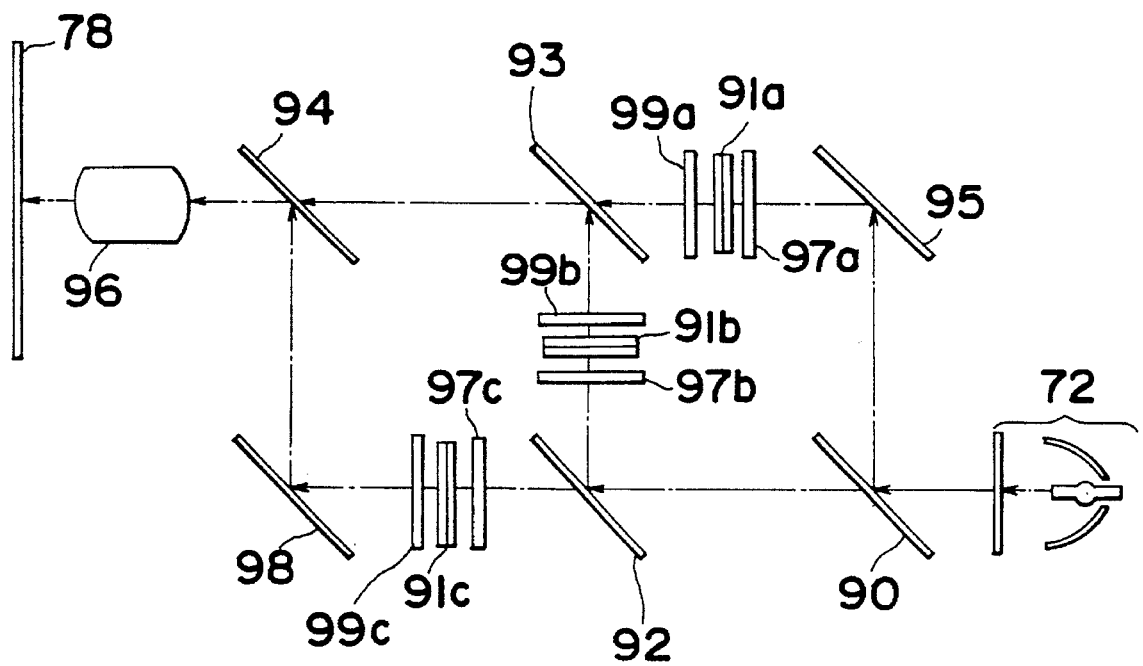
FIG. 9 is a schematic diagram showing one example of the liquid crystal projection device according to a fifth preferred embodiment of the present invention.

The liquid crystal projection device according to a fifth preferred embodiment of the present invention is shown in FIG. 9. Reference numerals 91a, 91b and 91c represents a liquid crystal panel; reference numeral 72 represents a light source; reference numeral 96 represents a projection lens; reference numerals 97a, 97b and 97c represent an incident side polarizing plate for each liquid crystal panel; reference numerals 99a, 99b and 99c represent an exit side polarizing plate for each liquid crystal panel; reference numeral 78 represents a polarizing screen; reference numerals 90, 92, 93 and 94 represent a dichroic mirror; reference numerals 95 and 98 represent a plane mirror.

Each of the liquid crystal panels 91a to 91c makes use of the polymer dispersed liquid crystal material and is of a structure as shown in FIG. 4.

The light source 72 and the polarizing screen 78 are substantially identical with those described in connection with the fourth preferred embodiment of the present invention and the details thereof are therefore not reiterated.

Light from the light source 72 enters a color separating optical system made up of the dichroic mirrors 90 and 92 and the plane mirror 95, where it is separated into three light components of primary colors. The light components so separated subsequently enter the associated liquid crystal panels 91a, 91b and 91c after having passed through the respective field lenses (not shown). Light components emerging outwardly from the respective liquid crystal panels 91a, 91b and 91c are combined together by a color combining optical system made up of the dichroic mirrors 93 and 94 and the plane mirror 98 and then enter the projection lens 96. Optical images are formed on the liquid crystal panels 91a, 91b and 91c as a change in light scattering condition in response to associated video signals applied thereto, which optical images are projected by the projection lens 96 onto the screen to provide an image display on an enlarged scale.

The incident side polarizing plates 97a to 97c and the exit side polarizing plates 99a to 99c are removably supported and, where a bright display is desired, they should be removed and the optical images are to be projected onto a non-polarizing screen. Also, the incident side and exit side polarizing plates 97a to 97c end 99a to 99c are supported for rotation and, therefore, where they are mounted, the respective directions of the axes of polarization of those polarizing plates must be substantially aligned with the direction of the axis of polarization of the polarizing screen.

The operation of the liquid crystal projection device shown in FIG. 9 will now be described in detail. It is, however, to be noted that, since respective modulating systems for the red, green and blue light components are identical with each other, reference will be made only to the modulating system for the blue light component.

The blue light reflected by the dichroic mirror 90 enters the incident side polarizing plate 97a. As this blue light passes through the incident side polarizing plate 97a, about 50% of it is absorbed by the incident side polarizing plate 97a and enters the liquid crystal panel 91a in the form of polarized light. The liquid crystal panel 91a controls the incoming light with its scattering and transmissive conditions controlled by a signal applied to the pixel electrodes. When the liquid crystal panel 91a is in the light scattering condition, the incident polarized light scatters and emerges outwardly therefrom with its direction of polarization being random. Then, about 50% of the light emerging outwardly from the liquid crystal panel 91a is absorbed by the exit side polarizing plate 99a. Of the rays of light having passed through the exit side polarizing plate 99a, only a portion thereof encompassed by the light collecting angle of the projection lane 96 reaches the screen 78. On the other hand, when the liquid crystal panel 91a is in the light transmissive condition, the incident polarized light emerges outwardly therefrom with no direction of polarization having been changed and, without being absorbed by the exit side polarizing plate 99a, subsequently reaches the screen 78 through the projection lens 96a. By so doing, an image of a contrast which is about twice that exhibited when the polarizing plates 97a and 99a are removed can be obtained. Similarly, the liquid crystal panel 91b modulates the green light component, and the liquid crystal panel 91c modulates the red light components, and the modulated light from the liquid crystal panels 91b and 91c are subsequently combines together by the dichroic mirrors 93 and 94 and the plane mirror 98 and then projected through the associated projection lenses 96 onto the screen so as to be superimposed one over the other. Also, since the polarizing screen is effective to reduce about 50% of the external light reflected thereby, any possible reduction in contrast in a bright environment can be suppressed.

Where the influence brought about by the external light is minimal, use may be made of a non-polarizing screen instead of the polarizing screen 78, and even in this case a higher contrast can be obtained.

Figure 10:
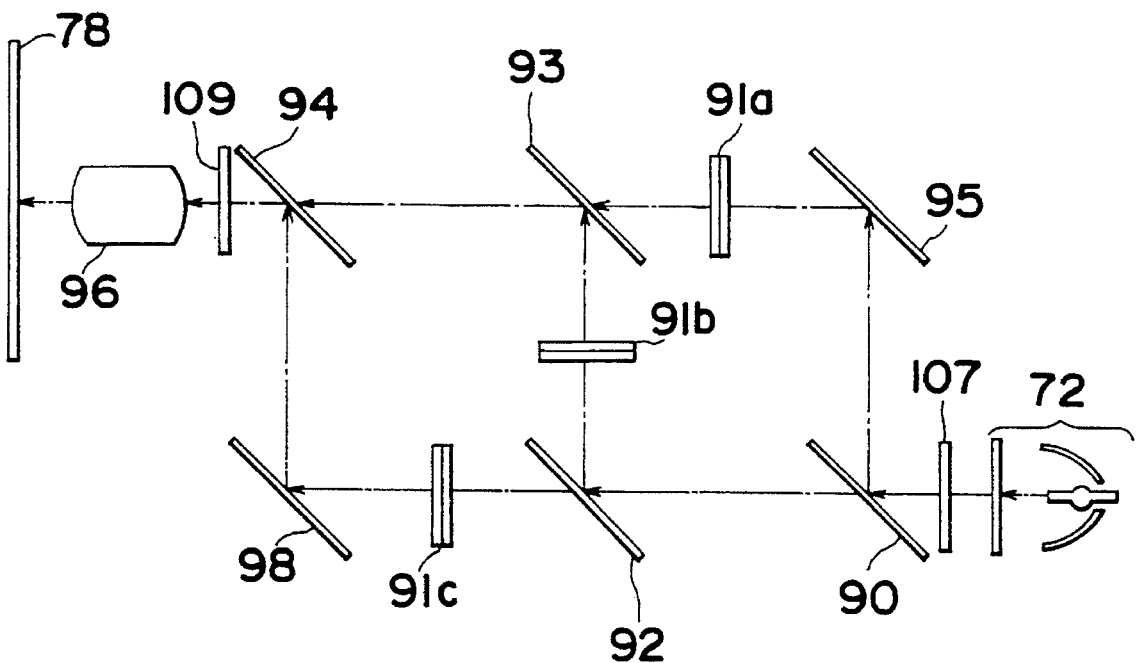
FIG. 10 is a schematic diagram showing another example of the liquid crystal projection device according to the fifth preferred embodiment of the present invention.

It is also to be noted that, as is the case with the first preferred embodiment of the present invention, only the incident side polarizing plates 97a, 97b and 97c may be used. Also, as shown in FIG. 10, instead of the use of the incident side polarizing plates 97a, 97b and 97c, a single incident side polarizing plate may be employed as shown by 107 and, instead of the use of the exit side polarizing plates, a single exit side polarizing plate may be employed as shown by 109. Where the single incident side and exit side polarizing plates 107 and 109 are employed, the incident side polarizing plate 107 is to be disposed at a position before the light from the light source is color separated and the exit side polarizing plate 109 is to be disposed at a position after the light components have been color combined by the dichroic mirrors.

Since the three liquid crystal panels 91a, 91b and 91c are used for modulating the blue, green and red light components, respectively, a projected image having a satisfactory brightness end a satisfactory resolution can be obtained. However, the light scattering characteristic of the polymer dispersed liquid crystal material has a wavelength dependency, and is therefore insufficient, particularly with regard to the red light component. Accordingly, it is preferred to equalize the respective light scattering characteristics of the liquid crystal panels 91a, 91b and 91c with each other by choosing the film thickness of, or the particle size of the liquid crystal material used in, at least one of the liquid crystal panels 91a, 91b and 91c so as to be different from those of the remaining liquid crystal panels.

Again, it is to be noted that each of the dichroic mirrors employed in each of the color separating and combining optical systems employed in the present invention may be a mere color filter.

Figure 11:
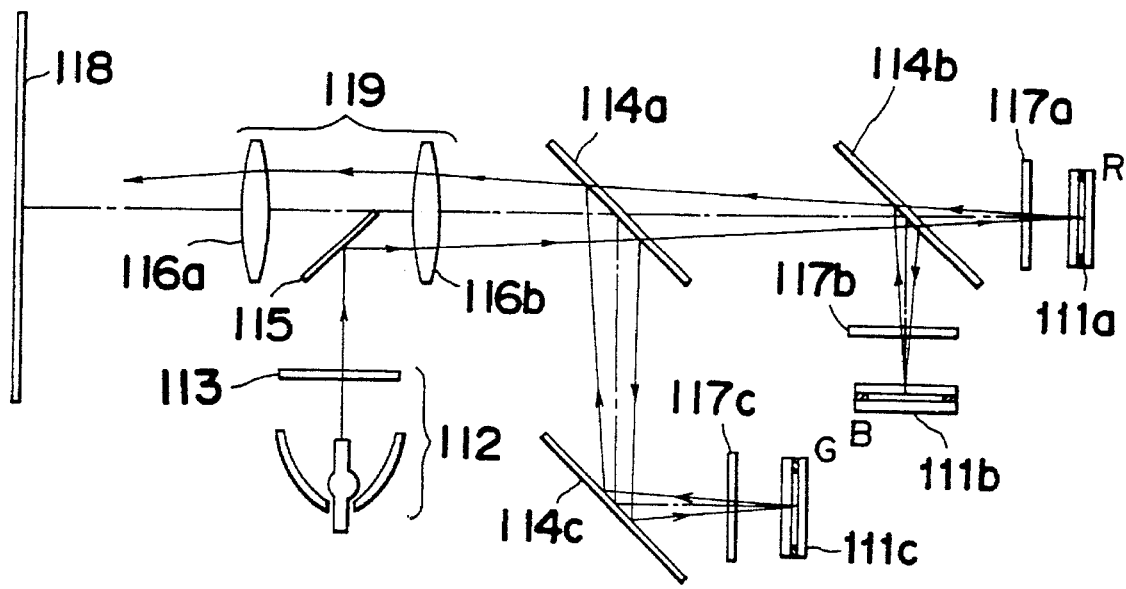
FIG. 11 is a schematic diagram showing one example of the liquid crystal projection device according to a sixth preferred embodiment of the present invention.

The liquid crystal projection device according to a sixth preferred embodiment of the present invention is shown in FIG. 11. While all of the preferred embodiments of the projection device of the present invention make use of a liquid crystal panel of a transmissive type, the projection device according to the sixth preferred embodiment of the present invention makes use of a liquid crystal panel of a reflective type.

Referring now to FIG. 11, reference numeral 112 represents a light source; reference numeral 113 represents a UVIR cut-off filter; reference numerals 114a and 114c represent a GDM; and reference numeral 114b represents a BDM. It is to be noted that the layout from the GDM 114a to the GDM 114c may not be limited to that shown and, instead of the GDM, a total reflection mirror may be employed for the element 114c. Reference numerals 111a, 111b and 111c represent polymer dispersed liquid crystal panels of a reflective type; reference numerals 116a and 116b represent lenses; and reference numeral 115 represents a mirror. It is to be noted that the elements 116a and 116b form a projection optical system 119. Reference numeral 118 represents a screen.

Polarizing plates 117a, 117b and 117c are removably mounted between the liquid crystal panels 111a to 111c and the dichroic mirrors 114a to 114c, respectively.

Hereinafter, the operation will be described. It is, however, to be noted that, since respective modulating systems for the red, green and blue light components are identical with each other, reference will be made only to the modulating system for the blue light component.

White light emitted from the light source 112 is reflected by the mirror 115 and is then color separated by the dichroic mirrors. A blue light component contained in the white light is reflected by the BDM 114b and then enters the liquid crystal panel 111b. The liquid crystal panel 111b is a liquid crystal panel of a reflective type in which one of the counter and pixel electrodes 45 and 46 shown in FIG. 4 are in the form of a reflecting electrode. In response to a signal applied to the pixel electrodes 26, the light scattering condition is controlled to modulate light. Light reflected during the light scattering condition of the liquid crystal panel 111b is shielded by the pupil of the projection lens 119 in which the mirror 115 is disposed. On the other hand, light having passed during the transmissive condition of the liquid crystal panel pass through the pupil of the projection lens 119. The light having so passed is projected by the projection lens 119 onto the screen 118 to provide an image display on an enlarged scale.

A similar operation takes place with respect to the red and green light components, and the GDM 114a and the BDM 114b provided for the color separation of the white light combines the light components modulated respectively by the liquid crystal panels to provide a single display image which is subsequently projected onto the screen through the projection lens.

When and so long as the polarizing plates 117a to 117c are mounted, and in the case where the liquid crystal panels of a reflective type are used as light valves, they are disposed as if positioned on both of the incident and exit sides with respect to the light and, therefore, the contrast can be increased as discussed in connection with the fifth preferred embodiment of the present invention.

Where a polarizing screen is employed for the screen 118, the polarizing plates 117a to 117c are to be rotated so that the respective directions of the axes of polarization thereof align substantially with the direction of the axis of polarization of the polarizing screen.

Figure 12:
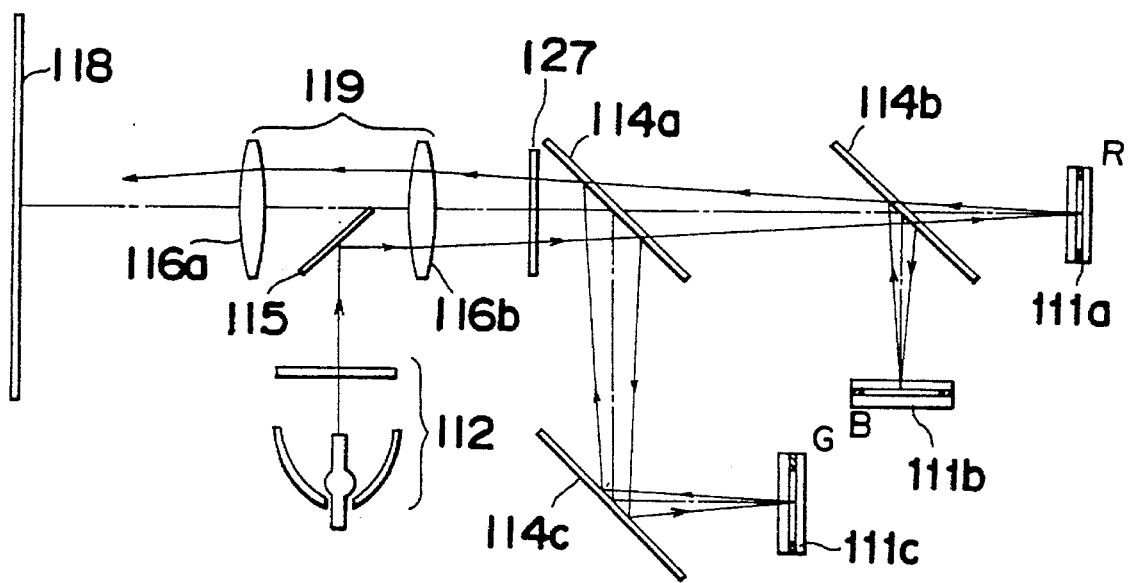
FIG. 12 is a schematic diagram showing another example of the liquid crystal projection device according to the sixth preferred embodiment of the present invention.

It is to be noted that, as shown in FIG. 12, the use may be made of a single polarizing plate 127 in place of the use of the polarizing plates 117a to 117c and in such case it should be disposed at a position before the light is color separated by the GDM 114a. Even in this case, the direction of the axis of polarization of the single polarizing plate 127 is to be aligned substantially with the direction of the axis of polarization of the polarizing screen. Alternatively, the polarizing plate 127 may be disposed on an optical path between the light source 112 and the mirror 115, in combination with the use of the polarizing screen.

In any one of the foregoing embodiments of the present invention, the polarizing element may not be always limited to the polarizing plate, and a polarizing beam splitter may be employed therefor.

Figure 13:
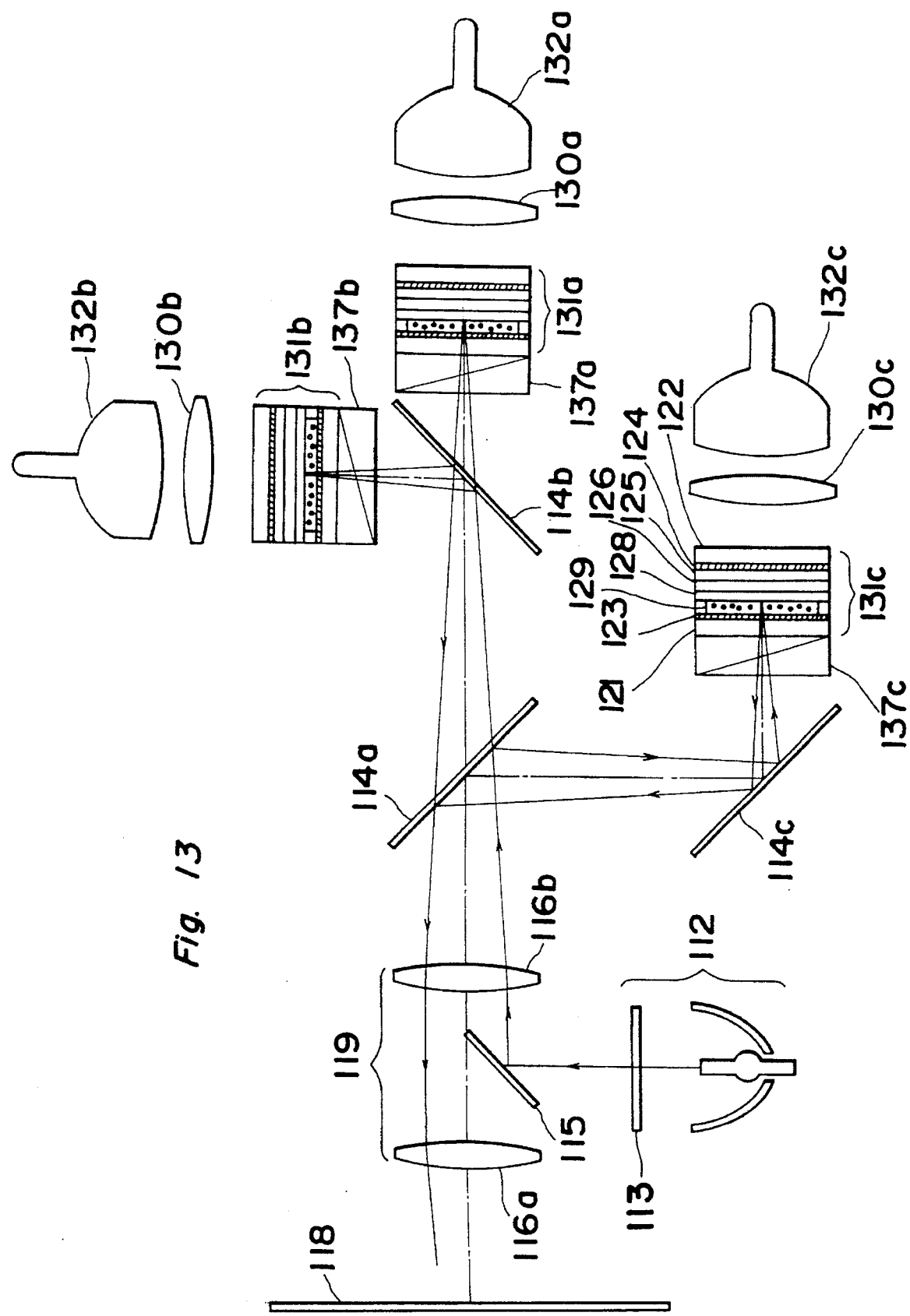
FIGS. 13 to 16 are schematic diagrams showing the liquid crystal projection device according to the seventh to tenth preferred embodiments of the present invention, respectively.

The liquid crystal projection device according to a seventh preferred embodiment of the present invention is shown in FIG. 13. In this embodiment of FIG. 13, in place of an active matrix type liquid crystal panel referred to hereinbefore, there is shown a light-writing type liquid crystal projection device in which a liquid crystal panel has, for example, a photoconductive layer, and is capable of being modulated from rear surface thereof by a writing means such as a cathode ray tube.

Referring now to FIG. 13, reference numeral 112 represents a light source; reference numeral 113 represents a UVIR cut-off filter; reference numerals 114a and 114c represent GDMs; reference numeral 114b represents a BDM; reference numerals 131a, 131b and 131c represent a polymer dispersed liquid crystal panel of a light writing type; and reference numerals 132a, 132b and 132c represent a cathode ray tube serving as a light writing means. Reference numerals 116a and 116b represent lenses, reference numeral 115 represents a mirror, and reference numeral 118 represents a screen. It is to be noted that the lenses 116a and 116b altogether form a projection optical system 119.

Since the liquid crystal panels 131a, 131b and 131c are of identical construction, reference will be made only to the liquid crystal panel 131c for modulating the green light component. A photoconductive layer 125, a light shielding layer 126, a dielectric mirror 128 and a polymer dispersed liquid crystal layer 129 are sandwiched between transparent electrodes 123 and 124 formed on respective surfaces of two transparent glass substrates 121 and 122. While a sufficient voltage required to render the polymer dispersed liquid crystal layer 129 to be transparent is applied across the transparent electrodes 123 and 124, the photoconductive layer 125 serves as a voltage modulator to control the voltage, applied to the liquid crystal layer 129, according to the varying intensity of a writing light emitted from the associated cathode ray tube 132c. In other words, in the absence of the writing light, the photoconductive layer 125 exhibits a sufficiently high impedance and, therefore, no voltage is applied to the liquid crystal layer 129. However, in the presence of the writing light, the impedance referred to above decreases as a function of the intensity thereof and a voltage is applied to the liquid crystal layer 129. The light shielding layer 126 serves to prevent light, which has been read out and leaked from the dielectric mirror 128, from reaching the photoconductive layer 125. The dielectric mirror 128 serves to reflect the written light and also to shield the written light from a writing system.

The operation will now be described. It is, however, to be noted that since the modulating systems for modulating the red, green and blue light components, respectively, are identical with each other, reference will be made only to the modulating system for modulating the blue light component. In the first place, white light emitted from the light source 112 and subsequently reflected by the mirror 115 is color separated by the dichroic mirror. The blue light component contained in the white light is reflected by the BDM 114b and subsequently enters the liquid crystal panel 131b. By inputting a picture, produced by the associated cathode ray tube 132b, to the liquid crystal panel 131b from rear surface thereof, and controlling the light scattering condition of the liquid crystal layer according to the varying intensity of the light so inputted, the light incident on the rear surface of the liquid crystal panel is modulated. The light reflected by the liquid crystal panel 131b during the light scattering condition is shielded by the pupil of the projection lens 119 in which the mirror 115 is disposed. Conversely, the light reflected during the transmissive condition of the liquid crystal panel passes through the pupil of the projection lens 119 and is then projected by the projection lens 119 onto the screen 118 to provide an image display on an enlarged scale.

A similar operation takes place with respect to the red and green light components, and the GDM 114a and the BDM 114b provided for the color separation of the white light combines the light components modulated respectively by the liquid crystal panels to provide a single display image which is subsequently projected onto the screen through the projection lens.

Each of the liquid crystal panels 131a, 131b and 131c has an exit side substrate to which a corresponding polarizing beam splitter 137a, 137b or 137c is optically coupled. Where the liquid crystal panels of a reflective type are used as light valves, the polarizing plates are disposed on the incident and exit sides with respect to the light, and therefore the contrast can increase as discussed in connection with the fifth preferred embodiment of the present invention. Moreover, since the exit side substrate of each liquid crystal panel is optically coupled with the polarizing beam splitter, and as discussed in connection with the effect of the optical coupling used in the second preferred embodiment of the present invention, about half of the scattered light totally reflected by the interface of the substrate backwardly towards the liquid crystal layer is removed by the polarizing beam splitter and, therefore, the contrast increases. Also, although a similar effect can be obtained even if the polarizing plate is optically coupled with the panel substrate, a problem will arise in that the polarizing plate absorbs light and the absorbed light is converted into heat which in turn brings about an increase of the temperature of the liquid crystal panel. In this respect, since the polarizing beam splitter does not absorb any light, there is no possibility that the temperature of the liquid crystal panel may increase.

Where no optical coupling is employed between the polarizing beam splitters and the liquid crystal panels, the polarizing beam splitters 137a, 137b and 137c are to be disposed between the liquid crystal panels 131a and the dichroic mirror 114b, between the liquid crystal panels 131b and the dichroic mirror 114b, and between the liquid crystal panels 131c and the dichroic mirrors 114c, respectively. If in such case a polarizing screen is employed for the screen 118, the polarizing beam splitters 137a, 137b and 137c are to be rotated to bring the respective directions of the axes of polarization thereof substantially into alignment with the direction of the axis of polarization of the polarizing screen.

It is to be noted that, as is the case with that shown in FIG. 12, instead of the use of the three separate polarizing beam splitters 137a to 137c, a single polarizing beam splitter may be employed and, in such a case, the single polarizing beam splitter is to be disposed at a position before the light is color separated by the GDM 114a. Alternatively, the polarizing beam splitter may be disposed on an optical path between the light source 112 and the mirror 115, in combination with the use of the polarizing screen. Even in such case, the direction of the axis of polarization of the polarizing beam splitter is to be substantially aligned with the direction of the axis of polarization of the polarizing screen.

Figure 14:
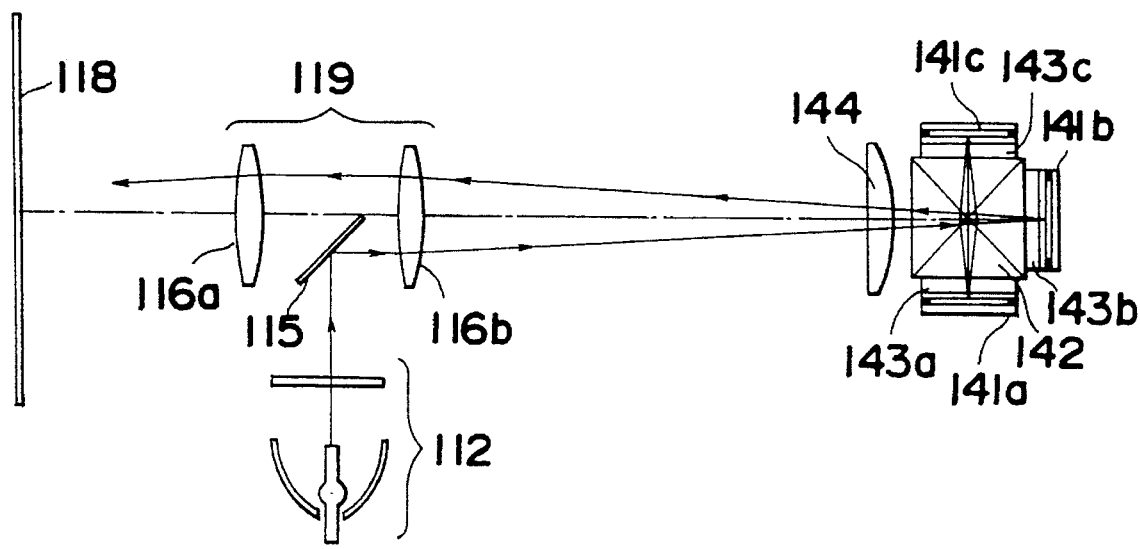

FIG. 14 illustrates the liquid crystal projection device according to an eighth preferred embodiment of the present invention. In this embodiment, as is the case with the sixth preferred embodiment of the present invention, a liquid crystal panel of a reflective type is employed for each of liquid crystal panels 141*a*, 141*b* and 141*c*. However, the embodiment of FIG. 14 differs from the sixth embodiment in that a single dichroic prism 142 is employed as a color separating and combining means in order to reduce the system size.

The dichroic prism 142 has a light ineffective surface painted with a black paint to absorb unnecessary scattered light to thereby avoid any possible reduction in contrast. Also, each of the liquid crystal panels 141*a* to 141*c* is cemented to respective surfaces of the dichroic prism 142 by means of transparent bond layers 143*a*, 143*b* and 143*c*. This is substantially similar to the effect of the optical coupling discussed in connection with the second preferred embodiment of the present invention and, therefore, the details thereof are not reiterated for the sake of brevity.

Also, arrangement may be made that three polarizing plates may be disposed in front of the associated liquid crystal panels as shown in FIG. 11.

Figure 15:
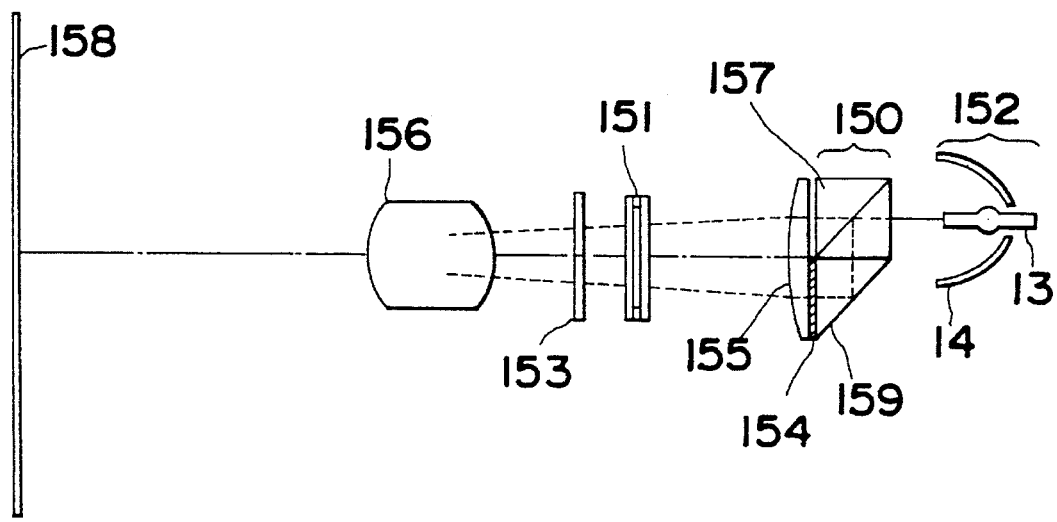

Shown in FIG. 15 is the liquid crystal projection device according to a ninth preferred embodiment of the present invention. In this ninth preferred embodiment, use has been made of a polarized light converting means 150 to increase the efficiency of utilization of light. The polarized light converting means 150 is constituted by a polarizing beam splitter (PBS) 157, a λ/2 plate 154 and a mirror 159. Light emitted from the light source 152 is natural light and the polarizing beam splitter 157 transmits only P-polarized light therethrough, but reflects S-polarized light having a light component vibrating in a direction perpendicular to the P-polarized light. The reflected S-polarized light is reflected by the mirror 159 backwardly to an optical path and is rotated by the half-wavelength plate 54 to provide P-polarized light, having its plane of polarization shifted 90° relative to the phase of the incoming light.

An exit side polarizing plate 153 is disposed between the liquid crystal panel 151 and the projection lens 156 with its axis of polarization aligned with the direction in which the P-polarized light passes. Where a polarizing screen is employed for the screen 158, this polarizing plate 153 need not be used, but the direction of the axis of polarization of the polarizing screen must be aligned with the direction of polarization of the light incident upon the liquid crystal panel. In such case, the half-wavelength plate 154 may be disposed on an optical path through which the P-polarized light emerging outwardly from the polarizing beam splitter 157 travels, or may be rotated about the optical axis of the polarized light converting means 150.

On the other hand, where no polarizing screen is employed, the half-wavelength plate can be used in the form as presented with no need to rotate the polarized light emerging outwardly from the polarized light converting mens 150. The P- and S-polarized light emerging outwardly from the polarized light converting means 150 is converged at different positions adjacent the pupil of the projection lens after having passed through the liquid crystal panel. The exit side polarizing plate may be disposed with its axis of polarization oriented so that the polarized light passes through the respective points of convergence.

Figure 16:
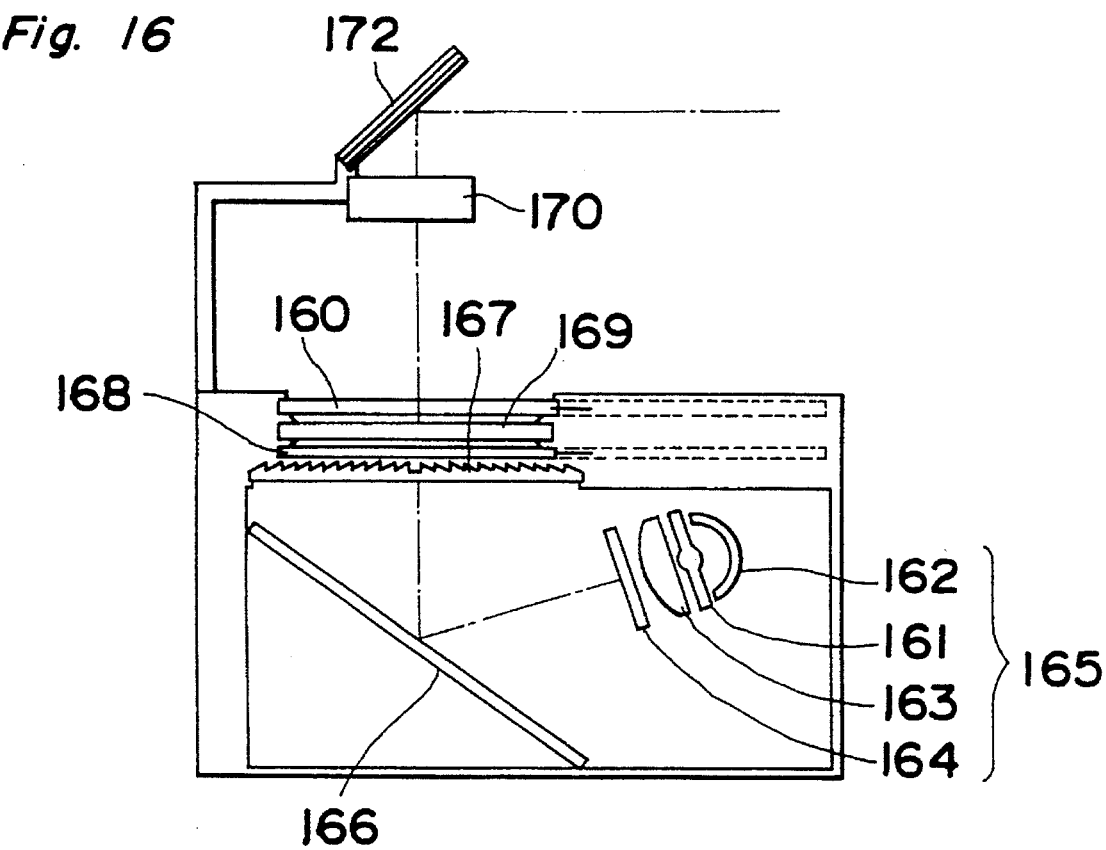

The liquid crystal projection device according to a tenth preferred embodiment of the present invention is shown in FIG. 16. This tenth embodiment of the present invention is an application to an over-head projector operable to project an optical image, formed on a liquid crystal panel as a function of change in the light scattering condition, onto a screen.

As shown in FIG. 16, a light source 165 includes a lamp 161, a concave mirror 162, a condenser lens 163 and an UVIR cut-off filter 164. Rays of light emitted from the light source 165 are reflected by a mirror 166 and are then condensed by a Fresnel lens 167 before they are incident on a liquid crystal panel 169. Polarizing plates 168 and 160 are disposed on the incident and exit sides of the liquid crystal panel 169. Each of the polarizing plates 168 and 160 is supported for sliding motion so that, when it is not desired to be used, it can be removed from, the optical path and stored. Rays of light emitted from the liquid crystal panel 169 are projected by a projection lens 170 onto a screen- A mirror 172 disposed immediately after the projection lens serves to deflect the direction of travel of the rays of light emerging from the liquid crystal panel 169.

Where the contrast of the projected image is desired to be increased, the two polarizing plates are disposed on the optical path, but where the projected image is desired to be brightened, the two polarizing plates are to be removed from the optical path. Where a polarizing screen is employed, only the incident side polarizing plate is sufficient and the exit side polarizing place should be left as stored.

If the liquid crystal panel having a RGB color filter for each pixel is employed, a color display can be obtained.

In the foregoing description, reference has been made to the various embodiments of the projection display device utilizing the projection lens for projecting a display on the liquid crystal panel to provide an image display on an enlarged scale. The present invention is, however, equally applicable to a directly viewable display device, one example of which is shown in FIG. 17.

Figure 17:
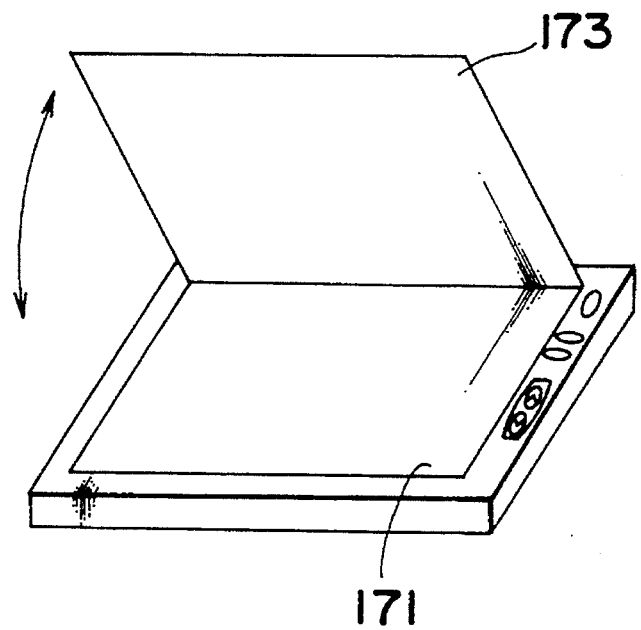
FIG. 17 is a schematic perspective view showing one embodiment of a liquid crystal display device according to the present invention.
Figure 18A:
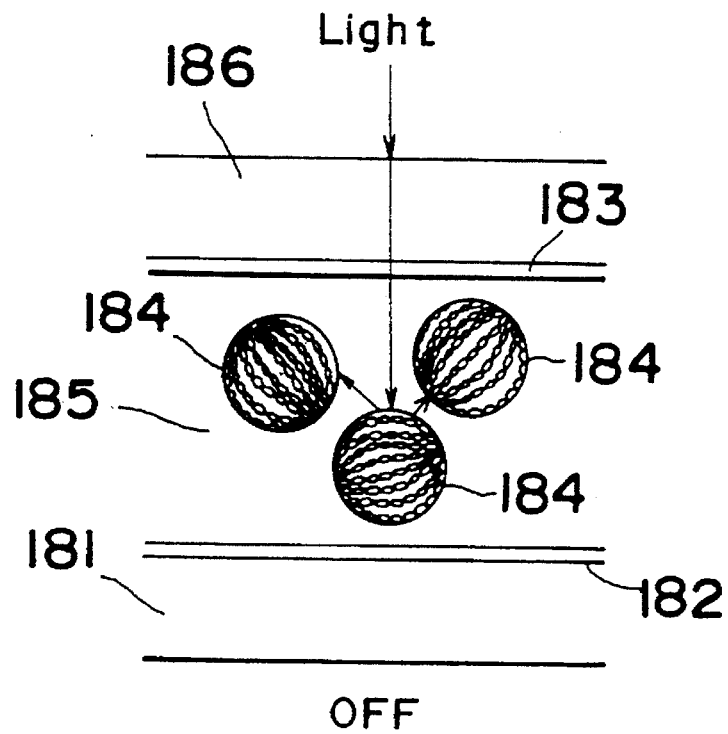
FIGS. 18A and 18B are schematic sectional views of a polymer dispersed liquid crystal panel in different operative positions, respectively, which are used to explain the operation of the polymer dispersed liquid crystal panel.
Figure 18B:
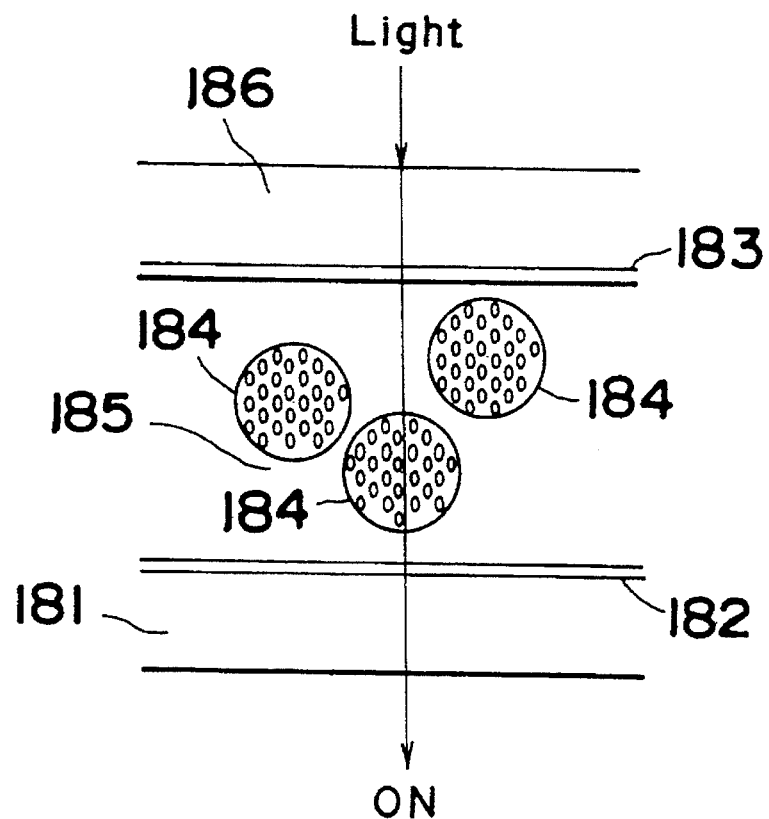

Referring now to FIG. 17, a liquid crystal panel 171 shown therein is a polymer dispersed liquid crystal panel of a reflective type. A polarizing plate 173 has one side coupled to a hinge so that the polarizing plate 173 can be manually moved between open and closed positions. Where a high contrast image is desired to be viewed, the polarizing plate 173 is to be folded down, but where a bright image is desired to be viewed, the polarizing plate 173 is to be erected. The polarizing plate 173 has a surface coated with an anti-reflection film and, therefore, even where a display is difficult to view due to reflection of external light, the use of the polarizing plate 173 then folded down is effective to absorb half of the external light and therefore reduction in contrast can advantageously be suppressed.

Even though the liquid crystal panel 171 is replaced with a polymer dispersed liquid crystal panel of a transmissive type, the directly viewable liquid crystal display device can be equally obtained provided that a backlight and a removable incident side polarizing plate are employed.

In any one of the foregoing embodiments the light valve may not be always limited to the polymer dispersed liquid crystal panel and any other member capable of forming an optical image as a function of change in light scattering condition may be employed such as, for example, PLZT.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A liquid crystal projection device, comprising:

a light generating means for generating light;

a liquid crystal panel for forming an optical image as a function of changes in a light scattering condition of said liquid crystal panel, said liquid crystal panel having a light incident side for receiving light from said light generating means;

a polarizing means disposed on said light incident side of said liquid crystal panel for polarizing light incident on said light incident side;

a polarizing screen; and a projection means for projecting an optical image from light from said liquid crystal panel onto said polarizing screen.

2. The liquid crystal projection device of claim 1, wherein said polarizing means is removably supported at a position between said light generating means and said liquid crystal panel so as to be movable into and out of a position in which light from said light generating means will be polarized for enabling optional use of said polarizing means when said projection means projects the optical image onto said polarizing screen.

3. The liquid crystal projection device of claim 1, wherein said polarizing means has an axis of rotation aligned with an optical axis between said light generating means and said liquid crystal panel and is rotatable about said optical axis.

4. The liquid crystal projection device of claim 1, wherein said polarizing means has a direction of an axis of polarization that is substantially aligned with a direction of an axis of polarization of said polarizing screen.

5. The liquid crystal projection device of claim 1, wherein said projection means comprises a projection lens having a pupil and a aperture adjacent to said pupil, said aperture having a variable diameter.

6. A liquid crystal projection device, comprising:

a light generating means for generating light;

a liquid crystal panel for forming an optical image as a function of changes in a light scattering condition of said liquid crystal panel, said liquid crystal panel having a light incident side for receiving light from said light generating means and a light exit side;

a first polarizing means disposed on said light incident side of said liquid crystal panel for polarizing light incident on said light incident side;

a second polarizing means disposed on said light exit side of said liquid crystal panel for polarizing light exiting from said light exit side; and a projection means for projecting an optical image from light from said exit side of said liquid crystal panel.

7. The liquid crystal projection device of claim 6, wherein each of said first and second polarizing means is removably supported at a position between said light generating means and said liquid crystal panel and between said liquid crystal panel and said projection means, respectively, so as to be movable into and out of a position in which light will be polarized for enabling optional use of said first and second polarizing means when said projection means projects the optical image.

8. The liquid crystal projection device of claim 6, wherein each of said first and second polarizing means has an axis of polarization rotatable about an optical axis of said light generating means, said polymer dispersed liquid crystal panel and said projection means such that said first and second polarizing means are rotatable about said optical axis.

9. The liquid crystal projection device of claim 6, wherein said first polarizing means has a direction of an axis of polarization that is substantially aligned with a direction of an axis of polarization of said second polarizing means.

10. The liquid crystal projection device of claim 6, and further comprising a polarizing screen having a polarizing element onto which the optical image projected by said projection means is projected.

11. The liquid crystal projection device of claim 10, wherein said first polarizing means has a direction of an axis of polarization and said second polarizing means has a direction of an axis of polarization that are substantially aligned with a direction of an axis of polarization of said polarizing screen.

12. The liquid crystal projection device of claim 6, wherein said projection means comprises a projection lens having a pupil and a aperture adjacent to said pupil, said aperture having a variable diameter.

13. A liquid crystal projection device, comprising:

a light generating means for generating light;

a reflective type liquid crystal panel for forming an optical image as a function of changes in a light scattering condition of said liquid crystal panel, said liquid crystal panel having a light incident side for receiving light from said light generating means;

a polarizing means disposed on said light incident side of said liquid crystal panel for polarizing light incident on said light incident side; and a projection means for projecting an optical image from light from said liquid crystal panel.

14. The liquid crystal projection device of claim 13, wherein said polarizing means is removably supported at a position between said light generating means and said liquid crystal panel so as to be movable into and out of a position in which light from said light generating means will be polarized for enabling optional use of said polarizing means when said projection means projects the optical image onto said polarizing screen.

15. The liquid crystal projection device of claim 13, wherein said polarizing means has an axis of rotation aligned with an optical axis between said light generating means and said liquid crystal panel and is rotatable about said optical axis.

16. The liquid crystal projection device of claim 13, and further comprising a polarizing screen having a polarizing element onto which the optical image projected by said projection means is projected.

17. The liquid crystal projection device of claim 16, wherein said polarizing means has a direction of an axis of polarization that is substantially aligned with a direction of an axis of polarization of said polarizing screen.

18. The liquid crystal projection device of claim 13, wherein said liquid crystal panel comprises an incident side substrate and said polarizing means comprises a polarizing beam splitter that is optically coupled with said incident side substrate.

19. A liquid crystal projection device, comprising:

a light generating means for generating light;

a color separating and combining means for separating rays of light from said light generating means into blue, green and red light components of predetermined wavelengths and combining the blue, green and red light components back together;

a reflective type liquid crystal panel for forming an optical image as a function of changes in a light scattering condition of said liquid crystal panel, said liquid crystal panel having a light incident side for receiving at least one of said blue, green and red light components;

a polarizing means disposed on said light incident side of said liquid crystal panel for polarizing light incident on said light incident side; and a projection means for projecting an optical image from light from said exit side of said liquid crystal panel.

20. A liquid crystal projection device, comprising:

a light generating means for generating light;

a first dichroic mirror and a second dichroic mirror for separating rays of light from said light generating means into blue, green and red light components of predetermined wavelengths and for combining the blue, green and red light components together;

a liquid crystal panel for forming an optical image as a function of changes in a light scattering condition of said liquid crystal panel, said liquid crystal panel having a light incident side for receiving at least one of said blue, green and red light components from said light generating means and a light exit side;

a first polarizing means disposed on said light incident side of said liquid crystal panel for polarizing light incident on said light incident side;

a second polarizing means disposed on said light exit side of said liquid crystal panel for polarizing light exiting from said light exit side; and a projection means for projecting an optical image from light from said exit side of said liquid crystal panel;

wherein said dichroic mirrors have an incident surface that is perpendicular to a direction of an axis of polarization of any one of said first and second polarizing means.

21. A liquid crystal display device, comprising:

a light generating means for generating light;

a liquid crystal panel for forming an optical image as a function of changes in a light scattering condition of said liquid crystal panel, said liquid crystal panel having a light incident side for receiving light from said light generating means and a light exit side; and first and second polarizing means disposed on said light incident side of said liquid crystal panel for polarizing light incident on said light incident side and on said light exit side of said liquid crystal panel for polarizing light exiting from said light exit side;

wherein said first and second polarizing means are removably supported at positions between said light generating means and said liquid crystal panel so as to be movable into and out of positions in which light from said light generating means that is incident on said light incident side will be polarized and light that exits said light exit side will be polarized for enabling optional use of said first and second polarizing means.

22. A liquid crystal display device, comprising:

a reflective type liquid crystal panel for forming an optical image as a function of changes in a light scattering condition of said liquid crystal panel, said liquid crystal panel having a light incident side for receiving light; and a polarizing means disposed on said light incident side of said liquid crystal panel for polarizing light incident on said light incident side;

wherein said polarizing means is removably supported on said light incident side of said liquid crystal panel so as to be movable into and out of a position in which light will be polarized for enabling optional use of said polarizing means.

* * * * *